US012174304B2

(12) United States Patent
Zyryanov

(10) Patent No.: US 12,174,304 B2
(45) Date of Patent: Dec. 24, 2024

(54) METHODS AND SYSTEMS FOR PROCESSING TIME-DIFFERENCED NAVIGATION SATELLITE SYSTEM OBSERVABLES

(71) Applicant: Trimble Inc., Sunnyvale, CA (US)

(72) Inventor: Gleb Aleksandrovich Zyryanov, Moscow (RU)

(73) Assignee: Trimble Inc., Westminster, CO (US)

( * ) Notice: Subject to any disclaimer, the term of this patent is extended or adjusted under 35 U.S.C. 154(b) by 334 days.

(21) Appl. No.: 17/866,176

(22) Filed: Jul. 15, 2022

(65) Prior Publication Data

US 2023/0168388 A1  Jun. 1, 2023

(30) Foreign Application Priority Data

Nov. 29, 2021 (RU) ................... 2021134906

(51) Int. Cl.
*G01S 19/44* (2010.01)
*G01S 19/20* (2010.01)
*G01S 19/30* (2010.01)

(52) U.S. Cl.
CPC .............. *G01S 19/44* (2013.01); *G01S 19/20* (2013.01); *G01S 19/30* (2013.01)

(58) Field of Classification Search
CPC ........... G01S 19/44; G01S 19/20; G01S 19/30
(Continued)

(56) References Cited

U.S. PATENT DOCUMENTS

| | | |
|---|---|---|
| 6,664,923 B1 | 12/2003 | Ford |
| 2007/0052583 A1 | 3/2007 | Zhodzishsky et al. |
| 2014/0240172 A1 | 8/2014 | Milyutin et al. |

FOREIGN PATENT DOCUMENTS

| | | | | |
|---|---|---|---|---|
| CN | 112444837 A | * | 3/2021 | ............ G01S 19/44 |
| EP | 3 336 584 A1 | | 6/2018 | |

(Continued)

OTHER PUBLICATIONS

Sickle, J. V., "Two Types of Observables | GEOG 862: GPS and GNSS for Geospatial Professionals," John A. Dutton e-Education Institute, College of Earth and Mineral Sciences, The Pennsylvania State University, retrieved from https://www.e-education.psu.edu/geog862/node/1752 on Nov. 8, 2021, 4 pages.

Extended European Search Report for Application No. 22181847.9-1206, mailed Jan. 5, 2023, 9 pages.

(Continued)

*Primary Examiner* — Harry K Liu
(74) *Attorney, Agent, or Firm* — Kilpatrick Townsend & Stockton LLP

(57) ABSTRACT

Some embodiments of the invention relate to methods carried out by an NSS receiver and/or a processing entity capable of receiving data therefrom, for estimating parameters derived from NSS signals. An estimator is operated, which uses state variables and computes the values thereof based on delta observables computed for a previous epoch. Previous residuals are obtained from the estimator, each previous residual being associated with a delta observable computed for the previous epoch. The previous residuals are then adjusted using a back-residual coefficient. Delta observables for a current epoch are computed. For each of at least some of the delta observables, the delta observable computed for the current epoch is corrected using the adjusted previous residual associated with the delta observable. The estimator is then operated for the current epoch at least based on the corrected delta observables.

19 Claims, 35 Drawing Sheets

(58) Field of Classification Search
USPC .......................................................... 342/352
See application file for complete search history.

(56) References Cited

FOREIGN PATENT DOCUMENTS

| | | | | |
|---|---|---|---|---|
| EP | 3627188 A1 | * | 3/2020 | ............. G01S 19/08 |
| EP | 3 130 943 B1 | | 3/2022 | |
| EP | 3 035 080 B1 | | 8/2022 | |
| JP | 2021038989 A | * | 3/2021 | |
| WO | 2012/151006 A1 | | 11/2012 | |

\* cited by examiner

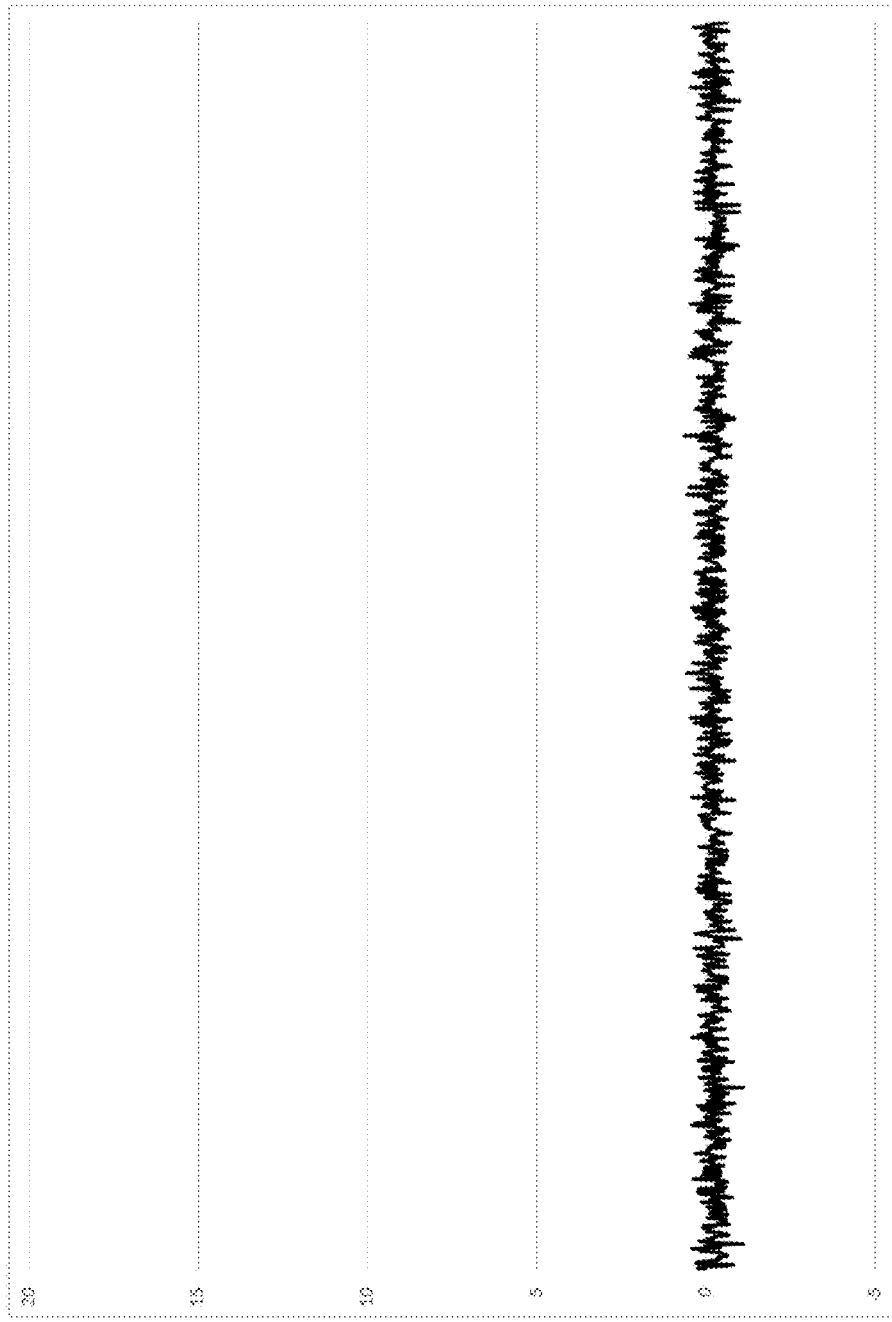

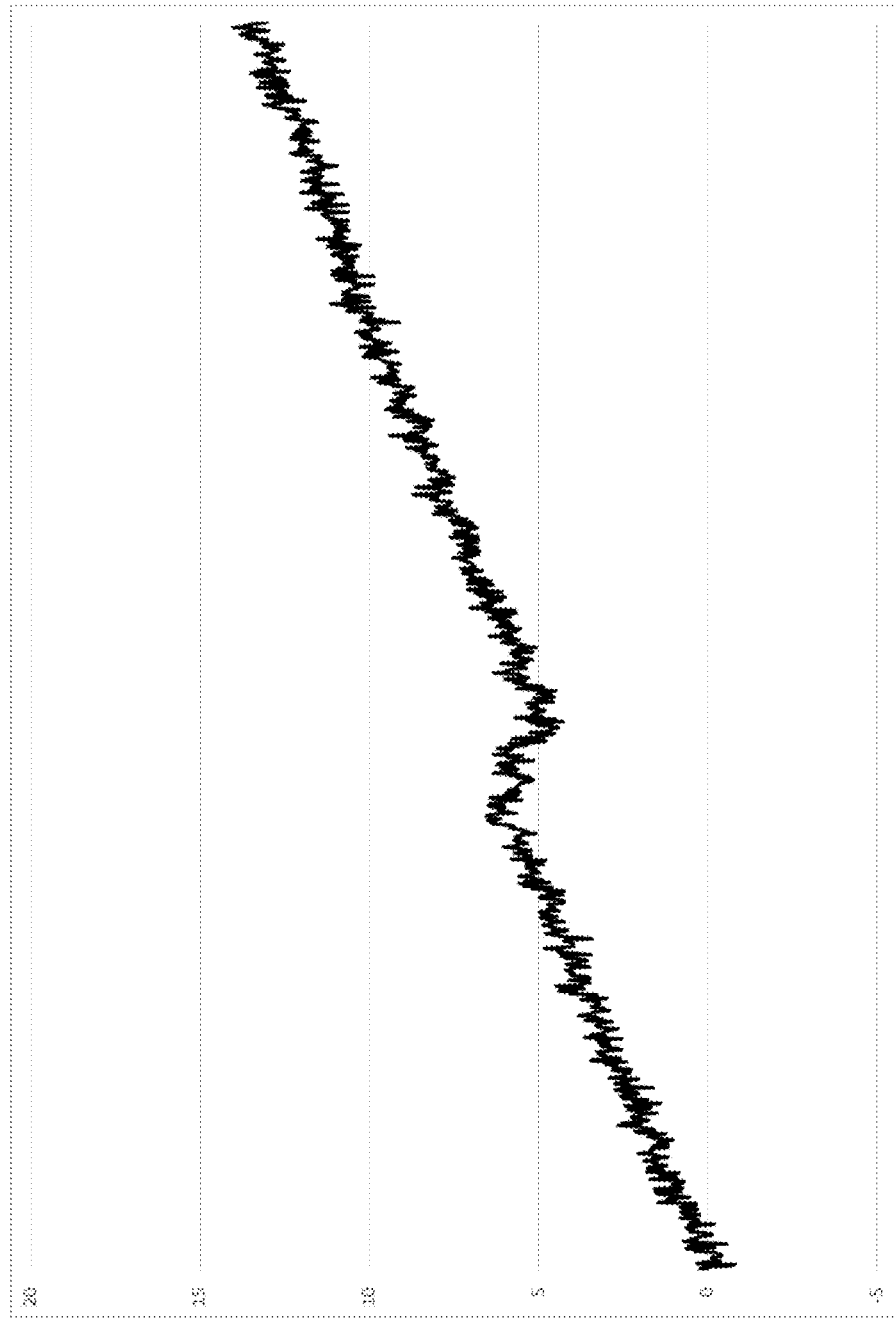

METHODS AND SYSTEMS FOR PROCESSING TIME-DIFFERENCED NAVIGATION SATELLITE SYSTEM OBSERVABLES

CROSS-REFERENCE TO RELATED APPLICATIONS

The present application claims priority to Russian Patent Application No. 2021134906, filed Nov. 29, 2021, the entire contents of which are incorporated herein by reference for all purposes.

FIELD OF TECHNOLOGY

The invention relates to methods, systems, and computer programs using navigation satellite system (NSS) observations for position estimation, trajectory estimation, or the like. The fields of application of the methods, systems, and computer programs include, but are not limited to, navigation, highly automated driving, autonomous driving, mapmaking, land surveying, civil engineering, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BDS (China), QZSS (Japan), and the Indian Regional Navigational Satellite System (IRNSS, also referred to as NAVIC) (systems in use or in development). An NSS typically uses a plurality of satellites orbiting the Earth. The plurality of satellites forms a constellation of satellites. An NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS and Galileo is provided for instance in sections 9, 10 and 11 of reference [1] (a list of references is provided at the end of the present description).

Positioning using NSS signal codes provides a limited accuracy, notably due to the distortion the code is subject to upon transmission through the atmosphere. For instance, the GPS includes the transmission of a coarse/acquisition (C/A) code at about 1575 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors, and multipath propagation.

An alternative to positioning based on the detection of a code is positioning based on carrier phase measurements. In this alternative approach or additional approach (ranging codes and carrier phases can be used together for positioning), the carrier phase of the NSS signal transmitted from an NSS satellite is detected, not (or not only) the code modulated on the signal transmitted from the NSS satellite.

The approach based on carrier phase measurements has the potential to provide much greater position precision, i.e. down to centimetre-level or even millimetre-level precision, compared to the code-based approach. The reason may be intuitively understood as follows. The code, such as the GPS C/A code on the L1 band, has an effective chip length that is much longer than one cycle of the carrier on which the code is modulated. The position resolution may therefore be viewed as greater for carrier phase detection than for code detection.

However, in the process of estimating the position based on carrier phase measurements, the carrier phases are ambiguous by an unknown number of cycles. The fractional phase of a received signal can be determined but the additional number of cycles required to determine the satellite's range cannot be directly determined in an unambiguous manner. This is the so-called "integer ambiguity problem", "integer ambiguity resolution problem", or "phase ambiguity resolution problem", which may be solved to yield the so-called fixed solution.

GNSS observation equations for code observations and for carrier phase observations are for instance provided in reference [1], section 5. An introduction to the GNSS integer ambiguity resolution problem, and its conventional solutions, is provided in reference [1], section 7.2. The skilled person in the art will recognize that the same or similar principles apply to RNSS systems.

The main GNSS observables are therefore the carrier phase and code (pseudorange), the former being generally much more precise than the latter, but ambiguous. These observables enable a user to obtain the geometric distance from the receiver to the satellite. With known satellite position and satellite clock error, the receiver position and receiver clock error can be estimated.

As mentioned above, the GPS includes the transmission of a C/A code at about 1575 MHz, the so-called L1 frequency. More precisely, each GPS satellite transmits continuously using two radio frequencies in the L-band, referred to as L1 and L2, at respective frequencies of 1575.42 MHz and 1227.60 MHz. With the ongoing modernization of the GPS, signals on a third L5 frequency are becoming available. Among the two signals transmitted on L1, one is for civil users and the other is for users authorized by the United States Department of Defense (DoD). Signals are also transmitted on L2, for civil users and DoD-authorized users. Each GPS signal at the L1 and L2 frequencies is modulated with a pseudo-random number (PRN) code, and optionally with satellite navigation data. When GNSS satellites broadcast signals that do not contain navigation data, these signals are sometimes termed "pilot" signals, or "data-free" signals. In relation to GPS, two different PRN codes are transmitted by each satellite: a C/A code and a P code which is encrypted for DoD-authorized users to become a Y code. Each C/A code is a unique sequence of 1023 bits, which is repeated each millisecond. Other NSS systems also have satellites transmitting multiple signals on multiple carrier frequencies.

Further, the processing of time-differenced carrier phase observables, also referred to as "delta phase" processing, is known in the art for precise position propagation to the current epoch. The basic delta phase processing principles are for example explained in reference [5], pp. 11-13, paragraphs [0035] to [0047]. Namely, "[i]f carrier phase tracking is maintained, the delta phase measurements give a precise measure of the change in range (distance) between user and satellite over time" (ibid., p. 11, paragraph [0036]).

The precise measure of the change in range notably stems from the fact that, in the delta phase observation equation, the carrier phase ambiguity term cancels out (ibid., p. 12, paragraphs [0044] and [0045]).

There is a constant need for improving the implementation of positioning or similar systems making use of NSS observables, and, in particular, systems making use of time-differenced NSS observables, also called "delta observables", for estimating trajectories.

SUMMARY

The present invention aims at addressing the above-mentioned need. The invention includes methods, systems, computer programs, computer program products and storage mediums as defined in the independent claims. Particular embodiments are defined in the dependent claims.

In one embodiment, a method is carried out by at least one of a navigation satellite system receiver, hereinafter abbreviated as "NSS receiver", and a processing entity capable of receiving data from the NSS receiver, for estimating parameters useful to, i.e. suitable to, determine a position. The NSS receiver observes at least one NSS signal from each of a plurality of NSS satellites over multiple epochs. The method comprises the following steps and/or operations: An estimation process, hereinafter referred to as "estimator", is operated for an epoch, hereinafter referred to as "previous epoch". The estimator uses state variables and computes the values of its state variables at least based on time-differenced observables, hereinafter referred to as "delta observables", computed for the previous epoch. Residuals, hereinafter referred to as "previous residuals", are obtained from the estimator, each previous residual being associated with a delta observable computed for the previous epoch. For each of at least some of the delta observables, the previous residual associated with the delta observable is adjusted, wherein adjusting comprises multiplying the previous residual with a coefficient, hereinafter referred to as "back-residual coefficient". Delta observables for another epoch, hereinafter referred to as "current epoch", are computed, wherein the current epoch follows the previous epoch, wherein computing the delta observables for the current epoch comprises differencing NSS observables observed by the NSS receiver at the current epoch and NSS observables observed by the NSS receiver at the previous epoch, and wherein the observed NSS observables comprise carrier phase observables and/or code observables. For each of at least some of the delta observables, the delta observable computed for the current epoch is corrected using the adjusted previous residual associated with the delta observable. The estimator is then operated for the current epoch at least based on the corrected delta observables.

The method addresses at least one drawback of processing delta NSS observables. Namely, the processing of delta observables has been found to be potentially sensitive to visible satellite constellation geometry changes (due to obstructions, loss of tracking, etc.), which can lead to random walk behaviour and undesired divergence of the positioning solution. The method is less sensitive to visible satellite constellation geometry changes than some prior art methods.

In one embodiment, a system comprises at least one of: a NSS receiver, and a processing entity capable of receiving data from the NSS receiver, the system being for estimating parameters useful to, i.e. suitable to, determine a position, the NSS receiver being configured for observing at least one NSS signal from each of a plurality of NSS satellites over multiple epochs, and the system being configured for carrying out the above-described method.

In some embodiments, computer programs, computer program products and storage media for storing such computer programs are provided. Such computer programs comprise computer-executable instructions for carrying out, when executed on a computer such as one embedded in a NSS receiver or in another apparatus, or when executed on a set of computers such as a set of computers embedded in a set of apparatuses, the above-described method.

BRIEF DESCRIPTION OF THE DRAWINGS

Embodiments of the present invention shall now be described in conjunction with the appended drawings in which:

FIG. 15b shows the trajectory obtained by processing the data shown in FIG. 15a with below-described technique A, i.e. "DefaultMode", in a non-claimed reference implementation;

FIG. 15c shows the trajectory obtained by processing the data shown in FIG. 15a with below-described techniques B, C, E, and F being combined, i.e. "OutlierDetection", "BackResid-1.0", "SyntheticResiduals", and "OutliernessAndPersistenceCheck", in one embodiment of the invention;

DETAILED DESCRIPTION

Figure 1:
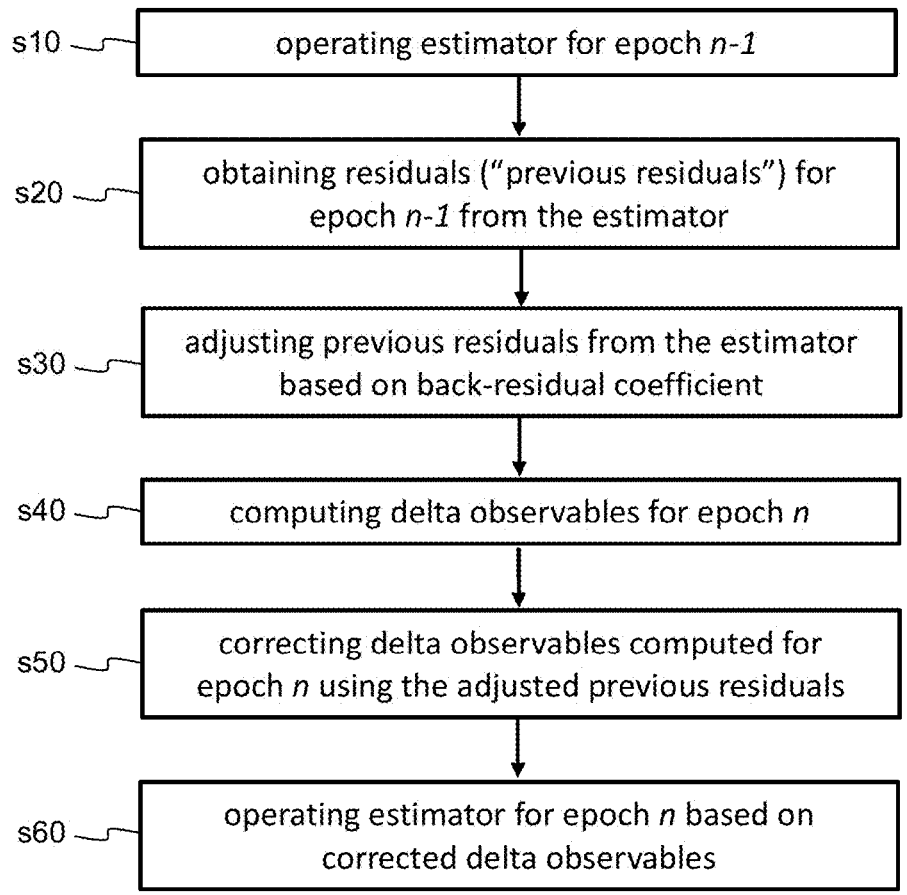
FIG. 1 is a flowchart of a method in one embodiment of the invention.

The present invention shall now be described in conjunction with specific embodiments. These serve to provide the skilled person with a better understanding but are not intended to in any way restrict the scope of the invention, which is defined by appended claims. In particular, the embodiments described throughout the description can be combined to form further embodiments to the extent that they are not mutually exclusive.

Throughout the following description, the abbreviation "GNSS" is sometimes used. The invention is, however, not limited to global navigation satellite systems (GNSS) but also applies to regional navigation satellite systems (RNSS). Thus, it is to be understood that each occurrence of "GNSS" in the following can be replaced with "RNSS" to form additional embodiments.

In the art, the term "observables" is often used to refer to structures of an NSS signal from which observations or measurements can be made (PRN-code, carrier phase) (see e.g. reference [4]: "The word observable is used throughout GPS literature to indicate the signals whose measurement yields the range or distance between the satellite and the receiver."). However, in common usage, and in the present document, the term "observable" (also referred to as "NSS observable") is also interchangeably used to refer to the observation itself, such that, for example, "carrier phase observable" has the same meaning as "carrier phase observation". Further, when the present document describes that an NSS signal is observed, this means that at least an observation (measurement) of at least an observable of the NSS signal is made. By extension, in the present document, terms such as "delta carrier phase observables" are also sometimes used although delta carrier phase observables are strictly speaking not directly observed but constructed, i.e. computed, based on observables.

When the term "real-time" is used in the present document, it means that there is an action (e.g., data is processed, results are computed) as soon as the required information for that action is available. Thus, certain latency exists, which depends on various aspects depending on the involved component(s) of the system.

When the verb "broadcast" (and "broadcasting", etc.) is used, this also covers embodiments where the transmission is a form of multicasting.

The processing of delta-carrier-phase observables, sometimes referred to simply as "delta phase" processing, is an effective approach for low-latency, precise position propagation to the current epoch. However, said processing has been found to often be sensitive to visible satellite constellation geometry changes, which may result in random walk type behaviour and undesired divergence of the positioning solution, i.e. random walk behaviour of the position divergence from the true position, or random walk behaviour of trajectory divergence from the true trajectory.

Some embodiments of the invention have been developed to reduce such random walk type behaviour in order to generate a trajectory estimate with minimal divergence, determined primarily by the satellite clocks and the atmosphere, and being less affected by the geometry of the satellite constellation, which may change rapidly due to obstructions, loss of tracking, detected outliers, etc.

Specifically, the processing of delta-carrier-phase observables is an example of delta observables processing that is known in the art. Such processing is beneficial in that the integer ambiguities in the carrier phases are cancelled out (as explained above with reference to reference [5]) during observation differencing so that a trajectory can be computed without the need to resolve ambiguities.

In a non-claimed, non-public reference implementation, the processing of delta-carrier-phase observables may go through the following steps:

(step 1) Computing delta-carrier-phase observables by differencing previous-epoch and current-epoch observables. This computation may be expressed mathematically as follows:

$$\text{deltacarrierphase}(t_k) = \text{carrierphase}(t_k) - \text{carrierphase}(t_{k-1})$$

where:
$t_k$ is the current time;
$t_{k-1}$ is the previous time; and
carrierphase($t_i$) is the carrier phase observation at time $t_i$.

Besides, the carrier phase measurement in meters can be expressed as follows:

$$\text{carrierphase}(t) = \text{range}(t) + \text{tropo}(t) - \text{iono}(t) + \text{rcvclock}(t) + \lambda*N + \text{noise}(t)$$

where:
the sign * denotes a multiplication;
range(t) is the distance from the receiver to satellite taking the satellite clock into account;
tropo(t) and iono(t) are the troposphere and ionosphere delays, respectively;
rcvclock(t) accounts for the receiver clock;
noise(t) accounts for the observation noise and multipath errors;
$\lambda$ is the wavelength of the carrier phase observable under consideration; and
N is an integer value (a so-called integer ambiguity), which remains constant unless a cycle slip or loss-of-lock occurs.

As can be seen from the above, when computing deltacarrierphase(t), unknown value N cancels out. Atmospheric effects are highly correlated in time. Thus, tropo($t_k$)−tropo($t_{k-1}$) and iono($t_k$)−iono($t_{k-1}$) are expected to be very small. The remaining parts are rcvclock($t_k$)−rcvclock($t_{k-1}$) and the actual change in receiver position (as also expressed for example in reference [5], p. 13, paragraph) [0047]), provided that, as a skilled person would understand, the change in satellite geometry is properly compensated for by using available satellite ephemeris and satellite clock estimates.

(step 2) Processing the data in e.g. a Kalman filter to compute the position increment between two epochs.

(step 3) Accumulating small position increments into a precise position trajectory. This accumulation may be expressed mathematically as follows:

$$\text{deltaposition}(t_k, t_m) = \sum_{i=k+1}^{i=m} \text{deltaposition}(t_i)$$

where:
deltaposition($t_i$) is a computed position increment between epochs $t_{i-1}$ and $t_i$; and
deltaposition($t_k$, $t_m$) is a resultant position increment for the time interval between $t_k$ and $t_m$.

(step 4) The computed precise trajectory can then be used for precise position propagation. This may be expressed mathematically as follows:

$$\text{position}(t_m) = \text{position}(t_k) + \text{deltaposition}(t_k, t_m)$$

where
position($t_k$) is the position computed for time $t_k$; and
position($t_m$) is the position for time $t_m$.

If the visible satellite constellation geometry and the observables noise model do not change (same satellites of unchanged tracking quality are available every epoch), this processing of delta-carrier-phase observables generally produces trajectory results equivalent to the usual undifferenced observables processing. However, with a rapidly changing visible satellite constellation geometry and changing observables noise model, a trajectory computed as a summation of small position increments computed using delta-carrier-phase observables may drift away in a random walk type manner, which is undesirable.

FIG. 1 is a flowchart of a method in one embodiment of the invention. The method may be carried out by a NSS receiver configured for observing NSS signals from a plurality of NSS satellites over multiple epochs, by another processing entity capable of receiving data from the NSS receiver, or by an NSS receiver in conjunction with such other processing entity (i.e., by an NSS receiver and another processing entity). The processing entity may be remotely located from the NSS receiver and may for example receive data representing the NSS observations from the NSS receiver.

In one embodiment, the method aims at estimating parameters derived from NSS signals useful to, i.e. suitable to, determine a position, such as the position of a rover receiver (also called "rover system" or simply "rover") or reference station. The method may eventually lead to estimating a rover position or reference station position. In one embodiment, the position is a position relative to a reference point or initial point, whose absolute position need not necessarily be precisely known, and the method aims at estimating a trajectory relative to the reference point or initial point.

The estimated parameters may for example indicate the most probable number of carrier cycles along the distance separating an NSS satellite from the NSS receiver, i.e. the estimated parameters may be the resolved integer ambiguity (although this is not necessary, as explained below). This also means that the method may estimate the position itself but not necessarily: parameters may be estimated that may be used, for example by another entity (such as a processing entity on a server dedicated to such task), to estimate or determine the position of the NSS receiver (e.g., a rover receiver) or of a reference station. Furthermore, other parameters such as, for example, properties of the ionosphere may be estimated. Indeed, if the position of both the NSS receiver and the plurality of NSS satellites are known, resolving the integer ambiguities may enable the determination of parameters affecting the transmission of the signals (or some components thereof) through the ionosphere or other parts of the atmosphere. Doing so is useful for example for generating a correction stream to be broadcasted to users (see e.g. references [2] and [3]).

Yet furthermore, beyond determining the position of a rover or a reference station, if the position of NSS receivers (such as reference stations) is known, solving the integer ambiguities in the carrier phases by solving observation equations may also be used to eventually estimate the position of a satellite.

However, in some embodiments, it is unnecessary to solve the integer ambiguities in the carrier phases because processing the delta-carrier-phase observables cancels out the integer ambiguities as explained above. Thus, in these embodiments, the parameters estimated by the method may instead be parameters representing a change in the NSS receiver position based on which a trajectory, i.e. a relative position over time, can be derived. In some embodiments, pseudorange code observables are used rather than, or in addition to, carrier phase observables. In some embodiments, Doppler observables are used in addition to carrier phase observables. In some embodiments, Doppler observables are used in addition to pseudorange code observables. In some embodiments, Doppler observables are used in addition to both carrier phase observables and pseudorange code observables.

The application relying on NSS observations to produce an estimate of said parameters, or a combination thereof, may for example be a highly automated driving or autonomous driving application relying on NSS observations to produce an estimate of the position, velocity, or acceleration of a vehicle.

In step s10, an estimation process, hereinafter referred to as "estimator", is operated for an epoch, hereinafter referred to as "previous epoch". The term "previous epoch" is introduced merely for the sake of convenience because, in the method described with reference to FIG. 1, some steps performed for, or in relation to, a given epoch have an impact on steps performed for or, in relation to, an epoch occurring after said given epoch. The estimator uses state variables and computes the values of its state variables at least based on time-differenced observables, hereinafter referred to as "delta observables", computed for the previous epoch. In one embodiment, the estimator computes a trajectory solution using NSS signals observed by the NSS receiver and more specifically using computed time-differenced observables. In a sub-embodiment of that embodiment, the estimator computes a trajectory solution using delta carrier phase observables (wherein "delta carrier phase observable" means time-differenced carrier phase observable). By "trajectory", it is here meant a change in position over time in contrast to a reference position. An estimator computing a trajectory solution using delta carrier phase observables is advantageous in terms of implementation notably because it may involve a relatively small number of states, i.e. a relatively small number of state variables, and because position increments are computed based on carrier phase observables (which are known to yield a more precise positioning solution than code observables) without having to resolve the integer ambiguities in the carrier phases.

The estimator is or comprises an algorithm, procedure, or process, or a piece of software, firmware, and/or hardware configured for implementing such an algorithm, procedure, or process, in which a set of state variables (or "state vector") is maintained over time, i.e. the values of the state variables are estimated based on measurements made over time. The measurements may comprise data representing the observed NSS signals. Step s10 may involve, in one embodiment, a Kalman filter, a least mean squares (LMS) estimator, and/or a robust estimator. In one embodiment, step s10 involves an LMS estimator with memory. In another embodiment, step s10 involves an LMS estimator without memory, i.e. an LMS estimator in which LMS estimates are computed independently per epoch. The invention is, however, not limited to the use of Kalman filter(s) and/or LMS estimator(s). Other estimation processes, filters, or filter techniques may be used.

The estimator's state variables may represent, for example, the position of the NSS receiver, an offset in the position of the NSS receiver relative to another position (the offset per se being therefore a relative position), an offset in the position of the NSS receiver relative to another epoch, the rate of change of the position, the rate of change of the offset in the position, a bias related to the NSS receiver, a bias related to any of the NSS satellites, a bias related to any of the satellite systems, a bias related to any of the NSS signals, the rate of change of any of the said biases, or any combination of the above.

In one embodiment, the time-differenced observables, i.e. the delta observables, may be computed for the previous epoch by differencing NSS observables observed by the NSS receiver at the previous epoch and observables observed by the NSS receiver at an epoch preceding the previous epoch, and wherein the observables comprise carrier phase observables and/or code observables.

In step s20, residuals, hereinafter referred to as "previous residuals", are obtained from the estimator. Each previous residual is associated with a delta observable computed for the previous epoch (by differencing observables observed by the NSS receiver at the previous epoch and observables observed by the NSS receiver at an epoch preceding the previous epoch, as explained above). Similarly as for the term "previous epoch", the term "previous residual" is merely introduced for the sake of convenience because, in the method described with reference to FIG. 1, the residuals (i.e., the previous residuals) associated with, and computable for, the previous epoch have an impact on steps performed for or, in relation to, an epoch occurring after said previous epoch.

As known in the art, the residual associated with an observable is the difference between an observable and an estimated (predicted) observable. The residual associated with a delta observable computed for a given epoch is the difference between a delta observable computed for the given epoch and an estimation of said delta observable for the given epoch.

In one embodiment, the residuals comprise at least one of: delta code observation residuals and delta carrier phase observation residuals (wherein "delta carrier phase observation" means time-differenced carrier phase observations).

In one embodiment, post-fit residuals, also called a posteriori residuals, are used. The post-fit residual associated with a delta observable is the difference between the delta observable at time t and an estimation (prediction) of the delta observable determined based on information available until and including time t and after updating the states of the estimator.

In step s30, for each of at least some of the delta observables (i.e., for each of the delta observables or for some of the delta observables), the previous residual associated with the delta observable is adjusted. The adjustment comprises multiplying the previous residual with a coefficient, hereinafter referred to as "back-residual coefficient".

In one embodiment, the back-residual coefficient has a fixed value, i.e. a value that is predetermined, that is to say determined prior to carrying out the method. In this embodiment, the value of the back-residual coefficient remains the same for a plurality of epochs. In one embodiment, the back-residual coefficient has a value that is larger than 0 and smaller than, or equal to, 1 (i.e., $0<\text{value}\leq 1$). Preferably, the back-residual coefficient has a value comprised between 0.05 and 1 (i.e., $0.05\leq\text{value}\leq 1$), more preferably a value comprised between 0.2 and 0.8 (i.e., $0.2\leq\text{value}\leq 0.8$), or even more preferably a value comprised between 0.35 and 0.65 (i.e., $0.35\leq\text{value}\leq 0.65$). For example, the value 0.4, 0.45, 0.5, 0.55, or 0.6 may be chosen.

A suitable value for the back-residual coefficient may be selected based on the following considerations. It is known in the art that residuals contain both noise and non-modelled systematic errors. The back-residual coefficient value may be selected based on a priori assumptions about the expected noise level and the expected systematic drifts. For example, if the delta-carrier-phase noise is expected to be a random variable with sigma equals to 1 cm and if the expected drift due to non-modelled delta ionosphere, delta troposphere, and delta satellite clocks is expected to be also within 1 cm per epoch, setting a back-residual coefficient value close to 0.5 has been found to generally provide better results than setting it to 0.99 or 0.0 (or close to 0.0, such as 0.05). If an observable is expected not to have any systematic errors, but just the noise, setting the associated back-residual coefficient to a value close to 1.0 (e.g. 0.95 or even 0.99) has been found to typically provide good results.

For the processing of delta-carrier-phase observables, some systematic errors are typically expected at least due to errors in satellite clocks and unpredictably changing atmosphere characteristics. In embodiments in which a constant (fixed) value for the back-residual coefficient is used, a value in the range 0.35 to 0.65 has been empirically found to generally provide optimal results.

In another embodiment, the value of the back-residual coefficient is determined dynamically during the execution of the method. The value of the back-residual coefficient may for example be determined dynamically based on an estimated observation drift over a time period preceding the current epoch, as will be described below with reference to FIG. 4. It has been found that back-residual coefficient values above 0.5 typically result in greater stability of the trajectory, demonstrating slower divergence. If an observable experiences very small drifts, a back-residual coefficient value close to 1, such as 0.95 or even 0.99, has been found to generally ensure even slower divergence. In contrast, if an observable experiences large drifts (e.g. due to rapid ionosphere or troposphere changes), large back-residual coefficient values may lead to undesirable accumulation of these atmospheric errors and may thus cause undesirable trajectory divergence. Thus, it is desirable to select an optimal back-residual coefficient value that is as large as possible but yet small enough not to cause accumulation of atmospheric and satellite-clock errors.

In step s40, delta observables are computed for another epoch, hereinafter referred to as "current epoch". The current epoch follows the previous epoch. Similarly as for the term "previous residual", the term "current epoch" is introduced merely for the sake of convenience because, in the method described with reference to FIG. 1, some steps performed for, or in relation to, a given epoch have an impact on steps performed for or, in relation to, an epoch occurring after said given epoch. An epoch n occurring after said given epoch n−1 is called "current epoch" when discussing operations performed for epoch n using input obtained, computed or determined for a preceding epoch n−1. In some embodiments, the same epoch n may be called, for the sake of convenience, "previous epoch" when discussing operations performed for epoch n that have an impact on a subsequent epoch n+1.

Computing s40 the delta observables for the current epoch comprises differencing NSS observables at the current epoch and NSS observables at the previous epoch. The observed NSS observables comprise carrier phase observables and/or code observables. In one embodiment, the observed NSS observables comprise carrier phase observables and, in that case, the delta observables may thus comprise delta carrier phase observables. In another embodiment, the observed NSS observables comprise code observables and, in that case, the delta observables may thus comprise delta code observables. In yet another embodiment, the observed NSS observables comprise carrier phase observables and code observables and, in that case, the delta observables may thus comprise delta carrier phase observables and delta code observables.

In step s50, for each of at least some of the delta observables (i.e., for each of the delta observables or for some of the delta observables), the delta observable computed for the current epoch is corrected using the adjusted previous residual associated with the delta observable. This may be performed by adding the adjusted previous residual associated to the delta observable. In one embodiment, as mentioned above, the back-residual coefficient has a value that is larger than 0 and smaller than, or equal to, 1. Applying of a reduced residual computed at the previous epoch to the newly generated delta observables has been found to provide a better accuracy, lower noise, and slower divergence, driven mostly by satellite clocks and atmosphere.

In step s60, the estimator for the current epoch is operated at least based on the corrected delta observables obtained from step s50. The above description of step s10, i.e. the estimator's operation for the previous epoch, is applicable mutatis mutandis to step s60, i.e. the estimator's operation for the current epoch. Namely, the estimator in step s60 also uses state variables and computes the values of its state variables at least based on delta observables but this time the delta observables are computed for the current epoch. The estimator's output may for example allow an absolute or relative position to be determined, such as the absolute or relative position of the NSS receiver. In one embodiment, performing step s60 may at the same time constitute performing step s10 for another occurrence of the method, as will be further discussed with reference to FIG. 2.

The method described with reference to FIG. 1 addresses at least one drawback of processing delta observables. Namely, the processing of delta observables has been found to be potentially sensitive to visible satellite constellation geometry changes (due to obstructions, loss of tracking, etc.), which can lead to random walk type behaviour and undesired divergence of the positioning solution. The method is less sensitive to visible satellite constellation geometry changes than some prior art methods. This means that the trajectory that may outputted by the estimator generally diverges in a slower manner. This enables longer propagation with higher accuracy and smaller noise for the end users. The method may be applied to any delta observable processing.

FIG. 1 schematically illustrates the operations of the method as sequential steps. For processing NSS observations and delta observables relating to one receiver epoch, the steps may be performed sequentially. However, the operations of the method may also be carried out in parallel, for example for successive receiver epochs, as will be further discussed with reference to FIG. 2.

In one embodiment, the method is performed at the receiver epoch rate. In another embodiment, the method is performed at a lower rate than the receiver epoch rate, which means computing the delta-carrier-phase observables at a lower rate than the receiver epoch rate and performing the other steps of the method at the same, lower rate. In one embodiment, the method is performed when a new set of measurements are used to update the positioning solution, and/or when the positioning solution is propagated using the estimator (regarding the meaning of "estimator" here, see above discussion of step s10). In one embodiment, the method is performed at a lower rate than the receiver epoch rate depending on a criterion, such as depending on the number of available satellites. For example, the method may be configured to be performed at a lower rate than the receiver epoch rate only if the number of available satellites is 6 or larger than 6. In another example, with a highly-inertial systems (heavy car, airplane) and with high update rate (100 Hz), the method may for example be performed at 10 Hz.

In one embodiment, the method is performed at least partially as part of a data post-processing process. In other words, the invention is not limited to a real-time operation. Rather, it may be applied for processing pre-collected data to determine a position, trajectory, or other information, in post-processing. For example, the observations may be retrieved from a set of data which was previously collected and stored; the processing may be conducted for example in an office computer long after the data collection and thus not in real-time.

Figure 2:
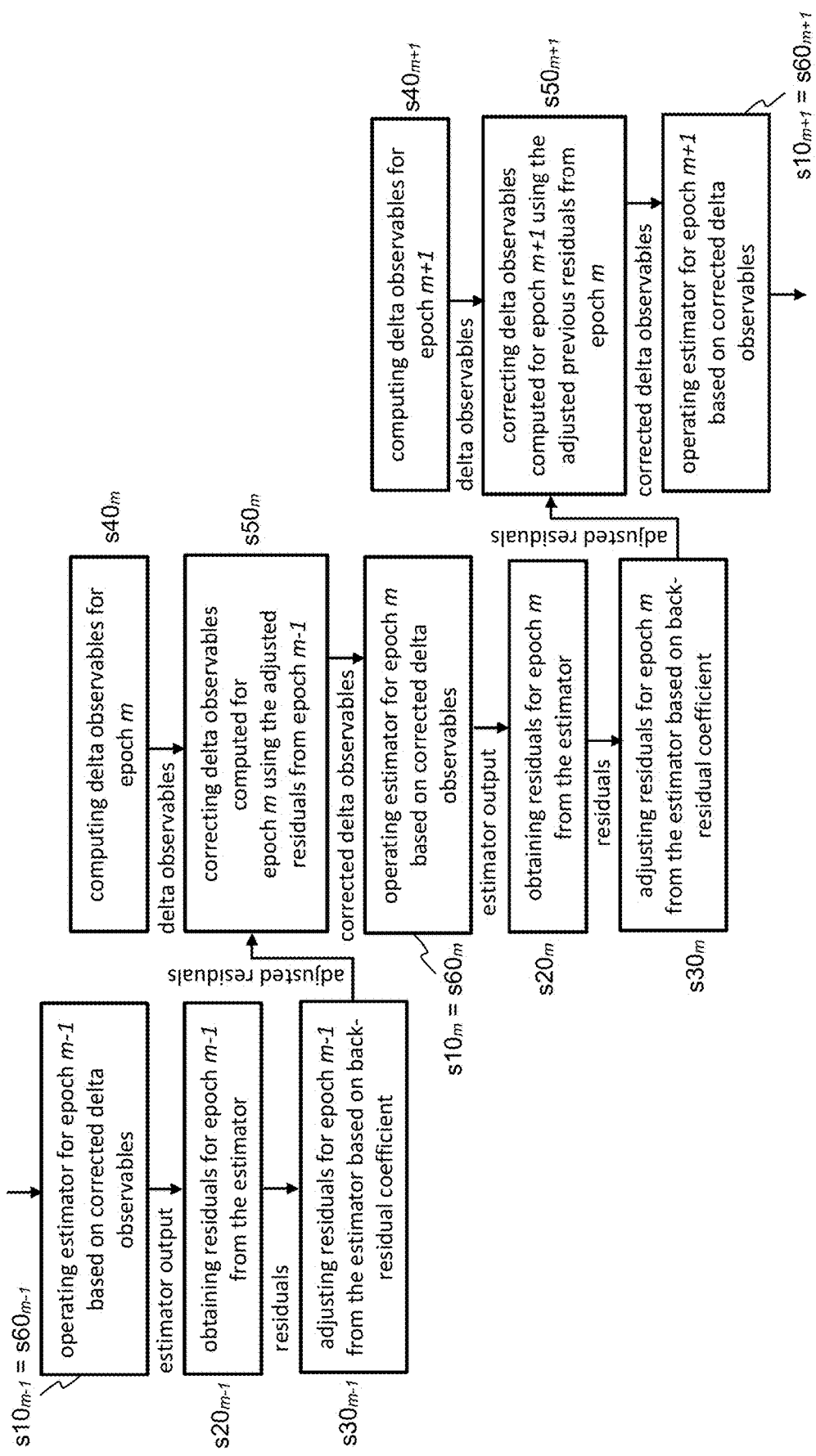
FIG. 2 is a flowchart of a method in one embodiment of the invention, including steps performed for three exemplary epochs m−1, m, and m+1, which are shown in three separate columns each corresponding to one epoch.

FIG. 2, which is to be read in conjunction with Table 1 below, is a flowchart of a method in one embodiment of the invention, which includes steps performed for at least three exemplary epochs m−1, m, and m+1, which are shown in three separate columns each corresponding to the processing steps performed for one epoch. That is, the first column comprises steps performed for epoch m−1, the second column comprises steps performed for epoch m, and the third column comprises steps performed for epoch m+1. As will be apparent from the description below together with Table 1, the method described with reference to FIG. 2 may be regarded as corresponding to repeating the method described with reference to FIG. 1, in which step s60 of a given occurrence of the method described with reference to FIG. 1 overlaps with step s10 of the next occurrence of the method described with reference to FIG. 1.

In the embodiment illustrated by FIG. 2, this overlapping may be specifically described as follows:

Operating the estimator for epoch m−1 (see FIG. 2, leftmost column, uppermost text box) may be regarded as constituting at the same time step s60 in a first occurrence of the method described with reference to FIG. 1 (the first occurrence involving both epochs m−2 and m−1, so that epoch index m−1 of FIG. 2 corresponds to epoch index n of FIG. 1 for the first occurrence) and step s10 in a second occurrence of the method described with reference to FIG. 1 (the second occurrence involving both epochs m−1 and m, so that epoch index m of FIG. 2 corresponds to epoch index n of FIG. 1 for the second occurrence). This overlap is illustrated by the indication "$s10_{m-1}=s60_{m-1}$" in FIG. 2, leftmost column (i.e., the last step of one occurrence is also, or in other words overlaps with, the first step of the next occurrence).

Likewise, operating the estimator for epoch m (see FIG. 2, middle column, third text box) may be regarded as constituting at the same time step s60 in the second occurrence and step s10 in a third occurrence of the method described with reference to FIG. 1 (the third occurrence involving both epochs m and m+1, so that epoch index m+1 of FIG. 2 corresponds to epoch index n of FIG. 1 for the third occurrence). This overlap is illustrated by the indication "$s10_m=s60_m$" in FIG. 2, middle column.

Further, operating the estimator for epoch m+1 (see FIG. 2, rightmost column, lowermost text box) may be regarded as constituting at the same time step s60 in the third occurrence and step s10 in a fourth occurrence of the method described with reference to FIG. 1 (the fourth occurrence involving both epochs m+1 and m+2, so that epoch index m+2 of FIG. 2 corresponds to epoch index n of FIG. 1 for the fourth occurrence). This overlap is illustrated by the indication "$s10_{m+1}=s60_{m+1}$" in FIG. 2, rightmost column.

Table 1 lists the correspondence between the steps illustrated in FIG. 2 and the successive occurrences of the method that has been described with reference to FIG. 1 as involved in the repetition illustrated in FIG. 2.

TABLE 1

Correspondence between the steps illustrated in FIG. 2 and the successive occurrences of the method described with reference to FIG. 1 as involved in FIG. 2, with overlapping steps shown in bold text

| Occurrences of method described with reference to FIG. 1 | Steps involved in the respective occurrence insofar as illustrated in FIG. 2 |
| --- | --- |
| First occurrence (corresponding to FIG. 1 in which n is replaced with m − 1) | $s60_{m-1}$ (the other steps of the first occurrence are not illustrated in FIG. 2) |
| Second occurrence (corresponding to FIG. 1 in which n is replaced with m) - this occurrence is carried out at the start of FIG. 2 | $s10_{m-1}$, $s20_{m-1}$, $s30_{m-1}$, $s40_m$, $s50_m$, $s60_m$ |
| Third occurrence (corresponding to FIG. 1 in which n is replaced with m + 1) | $s10_m$, $s20_m$, $s30_m$, $s40_{m+1}$, $s50_{m+1}$, $s60_{m+1}$ |
| Fourth occurrence (corresponding to FIG. 1 in which n is replaced with m + 2) | $s10_{m+1}$ (the other steps of the fourth occurrence are not illustrated in FIG. 2) |

In other words, in the embodiment illustrated by FIG. 2, the method described with reference to FIG. 1, which is carried out for two successive epochs, is repeated for consecutive epochs at the computation rate of the delta observables. This may eventually allow the trajectory of an NSS receiver to be estimated, i.e. tracked, based on the output of the estimator at each occurrence of step s60.

In one embodiment, the method may be initialized as follows.

In epoch 0, (a) no previous residuals are available, so that they are all set to zero; (b) no delta-carrier-phase observables can be computed, because only current epoch data is available, so that there is nothing to difference; and (c) no delta-carrier-phase observables are inputted in the estimator, because there is no data.

In epoch 1, (a) there are no previous residuals, so that they are all set to zero; (b) delta-carrier-phase observables can now be computed as the difference between carrier-phase observables from epoch 1 and carrier-phase observables from epoch 0; (c) the computed delta-carrier-phase observables can be processed in the estimator; and (d) the residuals obtained from the estimator may be stored in memory.

In epoch 2, (a) previous residuals are available, i.e. those obtained in step (d) from epoch 1; (b) in an embodiment in which the back-residual coefficients are not set in advance, they are computed for previous residuals (back-residual coefficients may be different for different satellites/signals); (c) the previous residuals are adjusted by multiplying them by corresponding pre-set or computed back-residual coefficients; (d) delta carrier phase observables are computed as the difference between carrier-phase observables from epoch 2 and carrier-phase observables from epoch 1; (e) the computed delta-carrier-phase observables are corrected by applying the adjusted previous residuals; (f) the corrected delta-carrier-phase observables are processed in the estimator; and (g) the residuals obtained from the estimator may be stored in memory. The processing for each of the following epochs may be similar to the processing for epoch 2.

In other words, at the first epoch (epoch 0 in the above example), delta-carrier-phase observables cannot even be computed. At the second epoch (epoch 1 in the above example), any previous residuals are not available yet and are assumed to be equal to zero. At the third epoch and each subsequent epoch, delta-carrier-phase observables may be computed, the back-residual coefficients (if dynamically set) are computed, the adjusted previous residuals are used to correct the delta-carrier-phase observables, and the estimator is updated with the corrected delta-carrier-phase observables.

As described above, the initialization process may be performed for all observables at the same epochs 0, 1, and 2. However, this invention is not limited to such an embodiment. In one embodiment, the initialization process is not necessarily be performed for all observables at the same epochs 0, 1, and 2. Some epoch may be the "epoch zero" for one observable (which was just acquired or which has just recovered from a loss of lock), while the same physical epoch may be "epoch 1" for some other observable and may be "epoch N" (N≥2) for some other observable, which was continuously tracked.

Figure 3A:
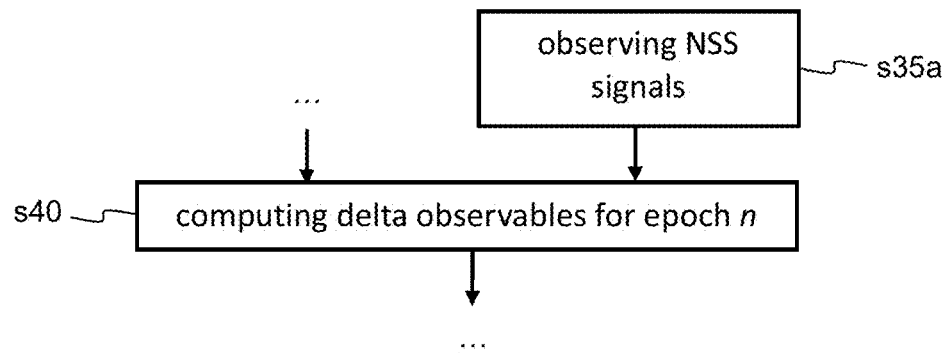
FIG. 3a is a flowchart of a method in one embodiment of the invention, further comprising observing NSS signals.

FIG. 3a is a flowchart of a method in one embodiment of the invention, further comprising a step s35a of observing NSS signals. That is, in this embodiment, steps s10 to s60 (not all illustrated in FIG. 3a) are carried out at least by an NSS receiver, and the NSS receiver also carries out step s35a of observing NSS signals. The ellipse, i.e. " . . . ", illustrated in the upper part of FIG. 3a represents steps s10 to s30 and any other steps or operations that may be performed before step s40. The ellipse in the lower part of FIG. 3a represents steps s50 and s60 and any other steps or operations performed after step s40.

Figure 3B:
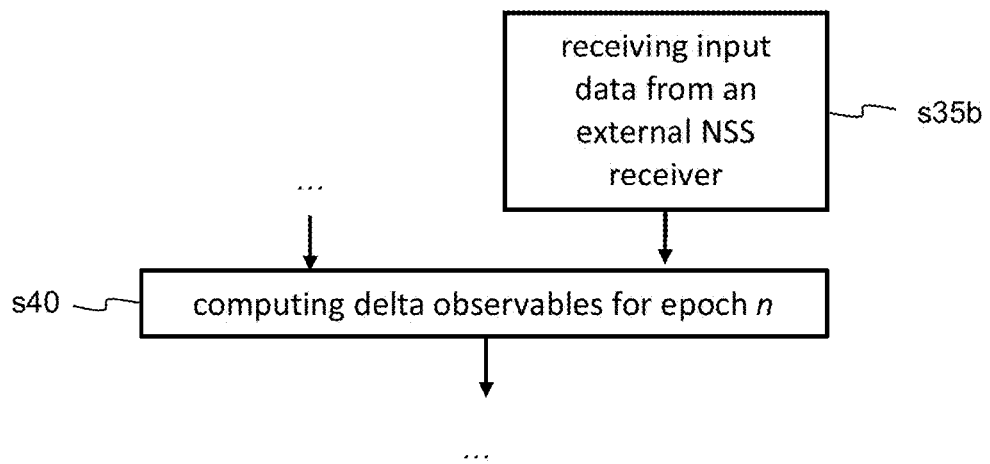
FIG. 3b is a flowchart of a method in one embodiment of the invention, wherein input data is received by a processing entity from an NSS receiver.

FIG. 3b is a flowchart of a method in another embodiment of the invention, wherein an NSS receiver observes NSS signals (not illustrated in FIG. 3b) and, then, in contrast to FIG. 3a, the NSS receiver transmits data representing the observed NSS signals, or information derived therefrom, to another processing entity or set of processing entities in charge of carrying out steps s10 to s60. As similarly described with reference to FIG. 3a, the ellipse in the upper part of FIG. 3b represents steps s10 to s30 and any other steps or operations that may be performed before step s40, whereas the ellipse in the lower part of FIG. 3b represents steps s50 and s60 and any other steps or operations performed after step s40.

Still with reference to FIG. 3b, the data representing the observed NSS signals, or information derived therefrom, may for example be transmitted from the NSS receiver in the form of data packets, such as IP packets, through, for example, any one of, or a combination of, the Internet, a cellular network, and a suitable satellite link. The skilled person would, however, appreciate that other forms of wired or wireless transmission may be used, such as, and without being limited to, wireless transmissions based on Bluetooth, Wi-Fi, or Li-Fi. In one embodiment, the data representing the observed NSS signals is transmitted in real-time, i.e. as soon as available (in line with the above-mentioned definition of the term "real-time"). In one embodiment, the data representing the observed NSS signals is transmitted as a data stream in that messages containing said data are transmitted at regular or irregular intervals through the same communication medium or channel. The data representing the observed NSS signals may be encoded and/or encrypted prior to transmission.

Figure 4:
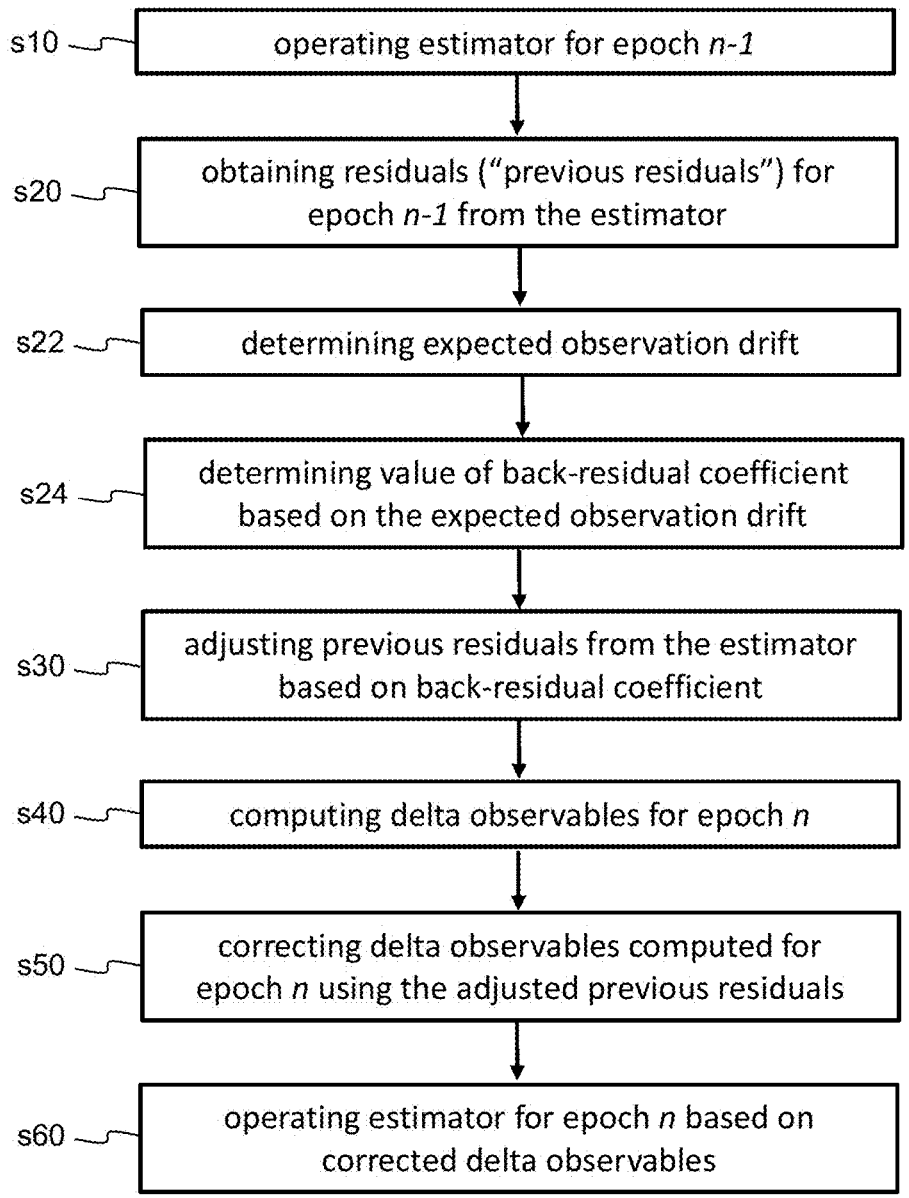
FIG. 4 is a flowchart of a method in one embodiment of the invention, further comprising determining an estimated observation drift and determining a value of a back-residual coefficient.

FIG. 4 is a flowchart of a method in one embodiment of the invention, further comprising the following steps and/or operations s22 and s24, performed for each of at least some of the delta observables associated with the residuals, i.e. for each of the delta observables or for some of the delta observables. An estimated observation drift over a time period preceding the current epoch is determined s22. Then, a value of the back-residual coefficient associated with the delta observable is determined s24 based on the estimated observation drift, wherein the larger the estimated observation drift, the smaller the back-residual coefficient.

The estimated observation drift, which is determined per delta observable, may be explained as follows. A computed delta observable contains unmodelled atmospheric and satellite clock errors. These errors are highly correlated in time so that they are small for each individual delta observable. However, due to their correlated nature, the error may accumulate if not properly handled. The estimated observation drift is the expected or estimated rate of change for the atmospheric and satellite clock errors.

The "time period preceding the current epoch", i.e. the time period over which the estimated observation drift is determined in step s22, may be any suitable time period. For example, the time period may be two- to five-second long, although the invention is not limited to these exemplary values and other time periods may be used. In one embodiment, the determination of the estimated observation drift starts by initializing the estimated observation drift to zero and then residuals are analyzed for two to five seconds to produce an estimate for the drift.

Various methods may be used to determine the estimated observation drift. In one embodiment, residuals for a given delta observable are averaged over some period of time (e.g. two to five seconds) and the estimated observation drift is determined based on the accumulated residual. For example, with 10-Hz processing, the residuals may be +1, −1, +2, −1, +1, −1, +2, −1, +3, −3. Adding them up, we get +2, so the expected rate is determined to be about 2 per second or 0.2 per epoch.

Although steps s22 and s24 are illustrated in FIG. 4 as being performed after steps s10 and s20, steps 22 and s24 may alternatively be performed prior to or in parallel to both or one of steps s10 and s20.

Figure 5:
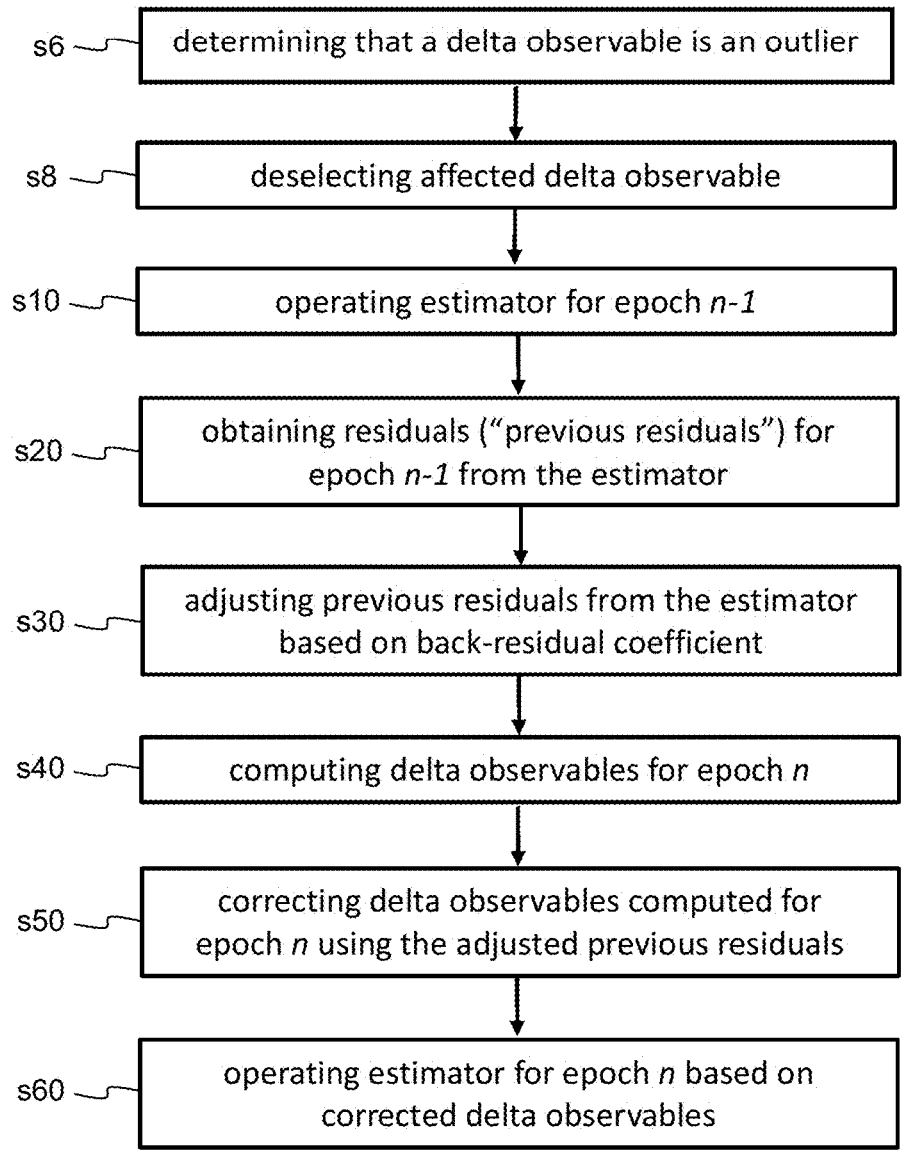
FIG. 5 is a flowchart of a method in one embodiment of the invention, further comprising determining that at least one delta observable (referred to as "affected delta observable") is an outlier and deselecting it.

FIG. 5 is a flowchart of a method in one embodiment of the invention, further comprising the following steps and/or operations: determining s6 that, for the previous epoch, one or more delta observable, hereinafter referred to as "affected delta observable", is or are an outlier (i.e., an NSS observation containing an unusually large error, for example, an error which exceeds three times the sigma value of the typical observations noise); and deselecting s8 the affected delta observable(s). Deselecting the affected delta observable(s) comprises, i.e. means, that the estimator is operated s10 for the previous epoch without taking the affected delta observable(s) into account.

The outlier detection process, i.e. step s6, may be performed by means of various techniques, as a skilled person would appreciate. For example, a standard Chi-squared test may be used. Various other approaches are known as explained for example in reference [6], p. 10, lines 36-38. The outlier detection procedure described in reference [7] may also be used.

In one embodiment, the outlier detection process, i.e. step s6, is performed independently at each epoch. This means that, in that embodiment, the identification of a delta observable as an outlier at one epoch (and hence its deselection in step s8) does not in itself have any impact on whether the delta observable may or may not be identified as an outlier at the next epoch.

Deselecting outliers is advantageous in that it generally ensures the provision of a more accurate positioning solution.

Although steps s6 and s8 are illustrated in FIG. 5 as being performed before step s10, steps s6 and s8 may be performed at each epoch (not illustrated in FIG. 5).

Figure 6:
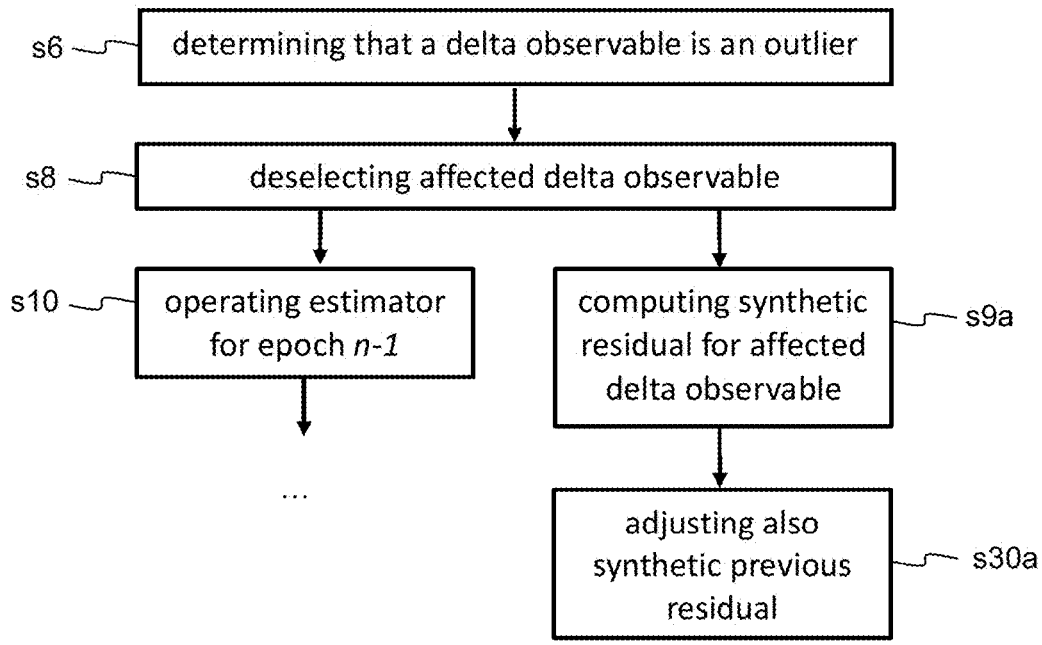
FIG. 6 is a flowchart of a method in one embodiment of the invention, further comprising computing, for each of at least one affected delta observable, an estimator-driven synthetic previous residual associated with the affected delta observable.

FIG. 6 is a flowchart of a method in one embodiment of the invention, further comprising, in addition to the steps described with reference to FIG. 5: computing s9a, for each of at least one affected delta observable, a previous residual, hereinafter referred to as "estimator-driven synthetic previous residual" (but also sometimes referred to simply as "synthetic residual" for the sake of conciseness), associated with the affected delta observable. The operation of, for each of at least some of the delta observables, adjusting s30 the previous residual associated with the delta observable comprises doing so also s30a for each estimator-driven synthetic previous residual.

An estimator-driven synthetic previous residual may for example be computed as follows. Let's assume an exemplary Kalman filter is used. The following equation applies in that respect:

$$R = m - H^* x$$

where:
R is a residual;
m is a measurement, i.e. a delta observable in the present context;
H is an observation model, mapping the actual state space to the observed space; and
x is a state vector (estimated state variables).

The residual R can be computed for measurements m that were processed by the estimator (e.g. a Kalman filter). However, the above computation may also be done for measurements that were not processed by the estimator. A so-called estimator-driven synthetic previous residual is computed based on the measurement at the previous epoch and the output from the estimator for the previous epoch but, for the observable corresponding to the estimator-driven synthetic previous residual, no measurement was inputted into the estimator for the previous epoch.

Deselecting outliers generally ensures optimal accuracy for the state variables estimates. Thus, to ensure the most accurate delta-position estimates, some delta observables may be deselected. While ensuring better accuracy of the individual delta-position estimates, deselecting outliers changes the visible satellite constellation geometry and as a result may have a negative effect on a long-term divergence of the computed trajectory. Computing estimator-driven synthetic previous residuals generally mitigates the potential negative long-term effect of the deselection of a delta observable and yet maintains optimal per-epoch results, as will be apparent for a skilled person in view of the discussion below with reference to FIGS. 11a to 16c.

Figure 7:
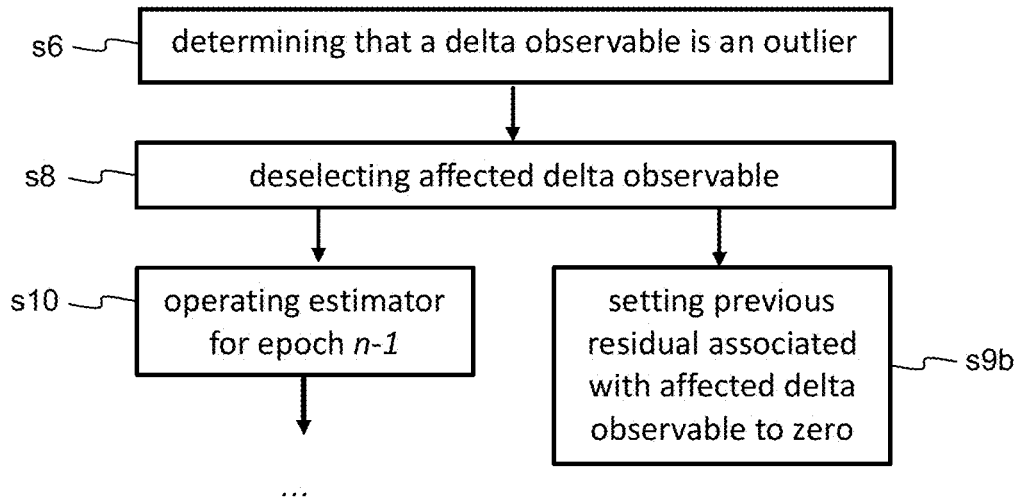
FIG. 7 is a flowchart of a method in one embodiment of the invention, further comprising resetting, for each of at least one affected delta observable, a previous residual associated with the affected delta observable.

FIG. 7 is a flowchart of a method in one embodiment of the invention, further comprising, in addition to the steps described with reference to FIG. 5: resetting s9b, for each of at least one affected delta observable, a previous residual associated with the affected delta observable, i.e., in the present context, setting s9b to zero.

Deselecting outliers generally ensures optimal accuracy for each epoch update. In other words, the deselection yields more accurate small position increments. Setting previous residuals to zero is sometimes suboptimal but it generally ensures a more robust operation, since, in case of an actual cycle slip on the carrier phase, the next residual is not corrected (in step s50) so that this missed cycle is not added in the delta observable, which would, if added, cause the delta observable to potentially become an outlier again. There are refined approaches that may allow a more optimal processing by using mostly non-zero estimator-driven synthetic residuals and yet maintaining robustness. These refined approached are discussed with reference to FIGS. 8 to 10.

Figure 8:
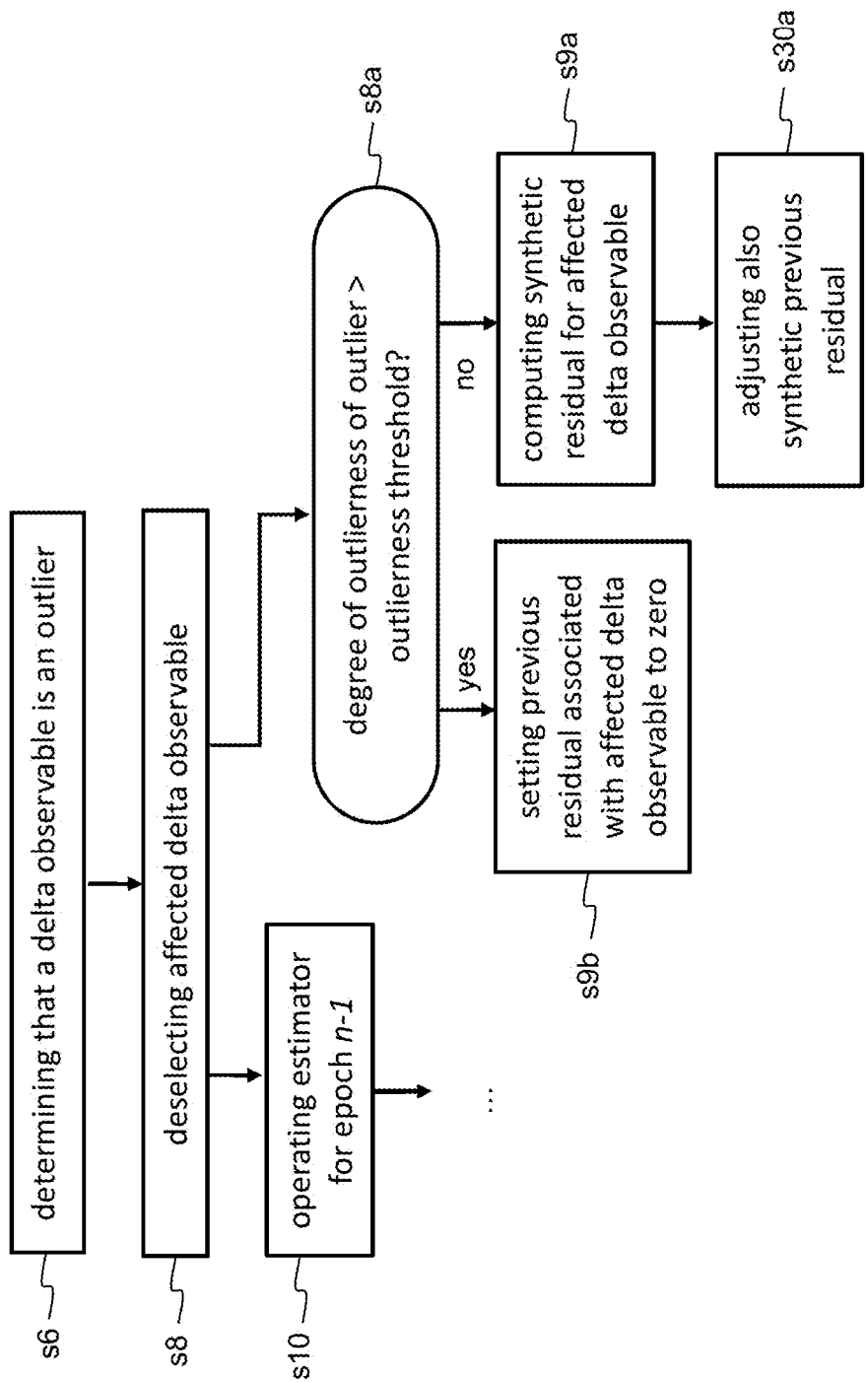
FIG. 8 is a flowchart of a method in one embodiment of the invention, further comprising inter alia determining whether a degree of outlierness of the outlier exceeds an outlierness threshold.

FIG. 8 is a flowchart of a method in one embodiment of the invention, further comprising, in addition to the steps described with reference to FIG. 5, for each of at least one affected delta observable, the following steps and/or operations. Whether a degree of outlierness of the outlier, which the affected delta observable has been determined to be, exceeds a threshold, hereinafter referred to as "outlierness threshold", is determined s8a. If so ("yes" after step s8a in FIG. 8), a previous residual associated with the affected delta observable is set s9b to zero. In other words, in this case, step s9b as described with reference to FIG. 7 is performed. Otherwise ("no" after step s8a in FIG. 8), a previous residual, hereinafter referred to as "estimator-driven synthetic previous residual", associated with the affected delta observable, is computed s9a. The operation of, for each of at least some of the delta observables, adjusting s30 the previous residual associated with the delta observable comprises doing so also s30a for the estimator-driven synthetic previous residual. In other words, in this case, steps s9a and s30a as described with reference to FIG. 7 are performed.

This approach takes greater advantage of the estimator-driven synthetic previous residuals and thus ensure a slower divergence of the trajectory. At the same time, it ensures greater robustness, since large outliers (e.g. caused by cycle slips) do not have a negative effect on the delta observable computed at the next epoch.

Figure 9:
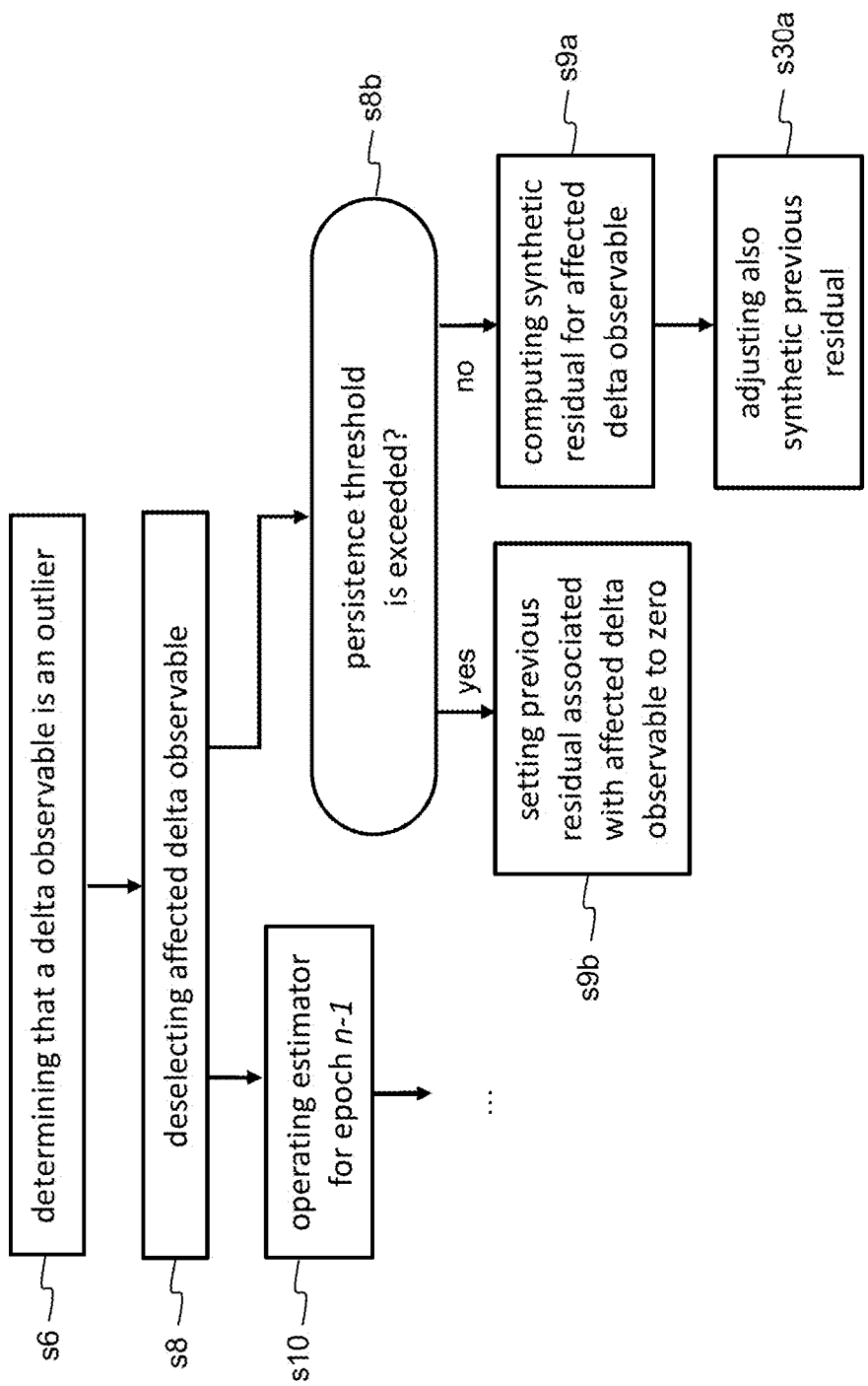
FIG. 9 is a flowchart of a method in one embodiment of the invention, further comprising inter alia determining whether one of a duration or a number of epochs during which an affected delta observable has been an outlier exceeds a persistence threshold.

FIG. 9 is a flowchart of a method in one embodiment of the invention, further comprising, in addition to the steps described with reference to FIG. 5, for each of at least one affected delta observable, the following steps and/or operations. Whether one of a duration or a number of epochs during which the affected delta observable has been an outlier exceeds a threshold, hereinafter referred to as "persistence threshold", is determined s8b. If so ("yes" after step s8b in FIG. 9), a previous residual associated with the affected delta observable is set s9b to zero. In other words, in this case, step s9b as described with reference to FIG. 7 is performed. Otherwise ("no" after step s8b in FIG. 9), an estimator-driven synthetic previous residual associated with the affected delta observable is computed s9a. The operation of, for each of at least some of the delta observables, adjusting s30 the previous residual associated with the delta observable comprises doing so also s30a for the estimator-driven synthetic previous residual. In other words, in this case, steps s9a and s30a as described with reference to FIG. 7 are performed.

The use of estimator-driven synthetic previous residuals ensures slower divergence of the trajectory. Yet, as explained earlier, this approach may lack robustness, since a true outlier (e.g. caused by a cycle slip) may negatively affect all consecutive delta observables for a given signal on a given satellite. Monitoring the status of delta observables over time helps timely detect this so that the corresponding previous residual may be reset and the negative effect from an undetected cycle slip may be discontinued.

Figure 10:
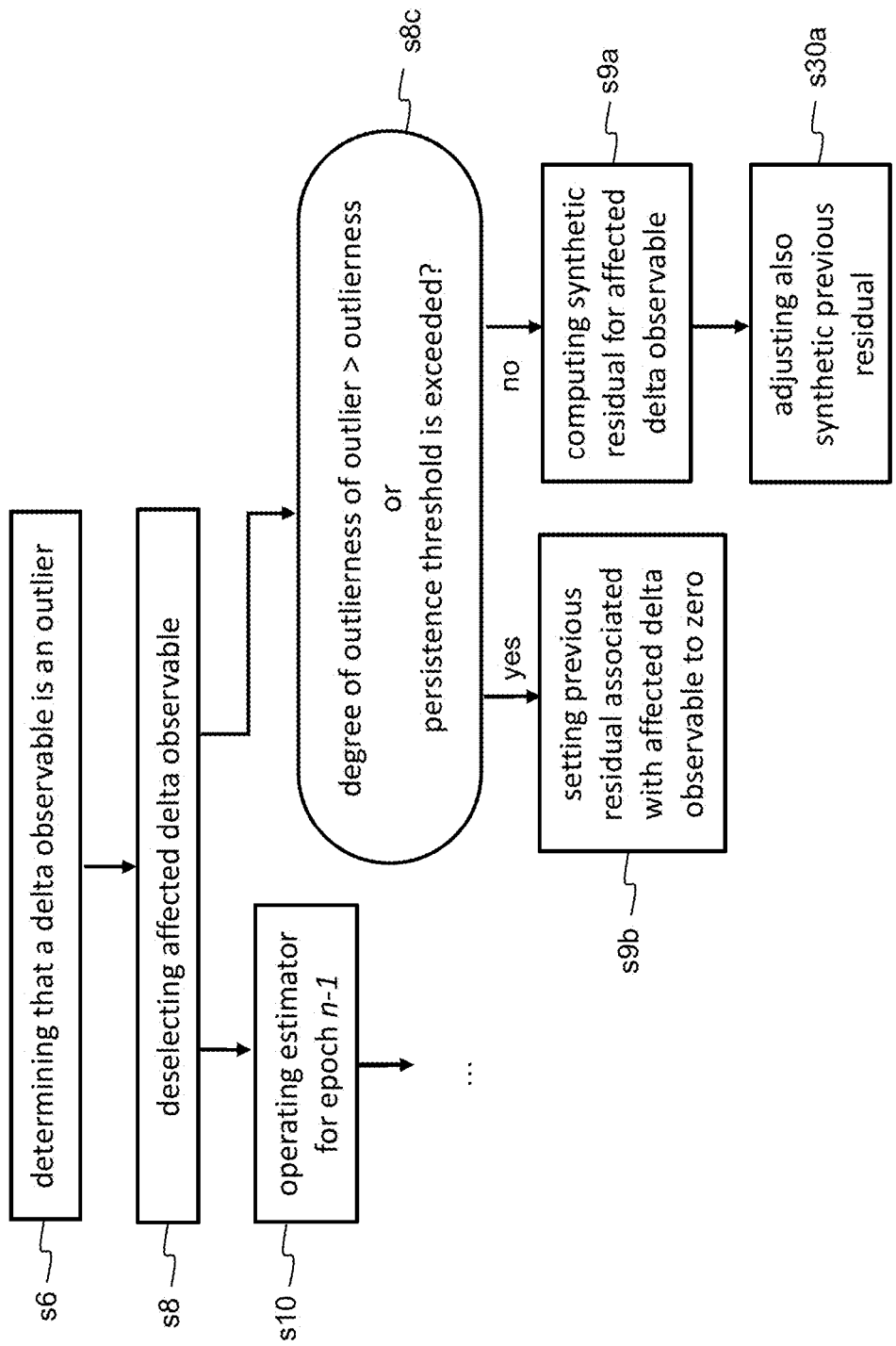
FIG. 10 is a flowchart of a method in one embodiment of the invention, further comprising inter alia determining whether a degree of outlierness of the outlier exceeds an outlierness threshold, or one of a duration or a number of epochs during which an affected delta observable has been an outlier exceeds a persistence threshold.

FIG. 10 is a flowchart of a method in one embodiment of the invention, which combines the embodiments described with reference to FIGS. 8 and 9. Namely, the method further comprises, in addition to the steps described with reference to FIG. 5, for each of at least one affected delta observable, the following steps and/or operations. Whether a degree of outlierness of the outlier, which the affected delta observable has been determined to be, exceeds an outlierness threshold, or one of a duration or a number of epochs during which the affected delta observable has been an outlier exceeds a persistence threshold is determined s8c. If so ("yes" after step s8c in FIG. 10), a previous residual associated with the affected delta observable is set s9b to zero. In other words, in this case, step s9b as described with reference to FIG. 7 is performed. Otherwise ("no" after step s8c in FIG. 10), an estimator-driven synthetic previous residual associated with the affected delta observable is computed s9a. The operation of, for each of at least some of the delta observables, adjusting s30 the previous residual associated with the delta observable comprises doing so also s30a for the estimator-driven synthetic previous residual. In other words, in this case, steps s9a and s30a as described with reference to FIG. 7 are performed.

This embodiment ensures the maximum benefit from the estimator-driven synthetic previous residuals while maintaining higher robustness. Large outliers (e.g., caused by cycle slips) are generally quickly detected based on their large value. Thus, they do not have any negative effect on the subsequent epoch. Meanwhile, if a delta observable is affected by some high noise or drifts during multiple consecutive epochs, these events are not remembered (since the previous residuals are reset in such case) and thus do not have any negative effect on the subsequent epochs, once the given delta observable becomes clean again.

In one embodiment, the outlierness threshold has a value that is selected depending on at least one of: the delta observable's type, and an expected noise level of the delta observable. Having a different outlierness threshold for e.g. delta-code observables and delta-carrier-phase observables is advantageous in view of the difference in precision typically associated with code observables and carrier-phase observables. For example, for delta-carrier-phase observables, a 20-cm outlier is most likely linked to the presence of a cycle slip, whereas, for code observables, a 20-cm outlier corresponds to a noise level which typically is caused by multipath.

In one embodiment, the outlierness threshold applicable to a delta carrier phase observable has a value comprised between 0.1 and 1 cycle, preferably a value comprised between 0.1 and 0.5 cycle. This embodiment is advantageous because, for carrier phase observables, it is generally desirable not to miss a cycle slip. In such case, it is therefore generally desirable that the value of the outlierness threshold be small enough. In another embodiment, the outlierness threshold applicable to a delta code observable has a value comprised between 0.1 and 10 meters, for example 3 meters or any other suitable value (which may for example be determined empirically). For code observables, there is no such thing as cycle slips, but outliers may for example be caused by high multipath or reflected signal tracking. Therefore, it may be desirable that an outlierness threshold be used because, if the code observable at a first epoch is an outlier, it is undesirable to keep this error indefinitely.

In one embodiment, the persistence threshold has a value that depends on at least one of: the delta observable's type; and an expected noise level of the delta observable. Having a different persistence threshold for e.g. delta-code observables and delta-carrier-phase observables may be advantageous for the following reasons: It has been found that, in practice, with e.g. 10 Hz processing, when delta-carrier-phase observable outliers are detected for 5 epochs (half-second), this is typically a good indicator of a problem with a given carrier. And, since there is a danger of missing a cycle slip and "blending it into position", it may be more robust to reset previous residuals. With code observables, the situation is different since there is no such thing as a cycle slip. But some multipath errors may easily last for couple of seconds, after which the value will return back to normal. The best persistence thresholds may be determined empirically.

In one embodiment, the persistence threshold has a value comprised between 2 and 10 epochs, preferably a value comprised between 2 and 5 epochs. Namely, if a given delta observable has been isolated for 2 to 5 consecutive epochs, the delta observable is likely faulty. Resetting the previous residual to zero avoids a negative influence in the future, once the observable has become normal. In one embodiment, the persistence threshold has a value comprised between 0.1 and 5 seconds, preferably a value comprised between 0.2 and 1 second for a delta carrier phase observable and preferably a value comprised between 0.1 and 5 seconds for a delta code observable.

The benefit of some embodiments of the invention will now be discussed with reference to FIGS. 11a to 16c.

First, single-dimensional examples will be discussed with reference to FIGS. 11a to 15d. A skilled person will nevertheless appreciate that the conclusions derived from these examples can generally be applied to multidimensional cases with no loss of generality, e.g. to processing delta-carrier-phase observables from GNSS receivers and computing a three-dimensional trajectory.

More specifically, let us assume that the ground stability in some seismic region should be monitored. Four measuring instruments (sensors), which measure altitude at their location, are taken. The number of sensors, here four, is taken as an example. A larger or smaller number of sensors could also be used. The absolute altitude at which an instrument (sensor) is located is not known. The measurement from an instrument (sensor) is an altitude estimate, which may have some constant bias and small noise. Let us assume that all four sensors are static and do not move. The aim is to monitor ground stability and seismic activity, so that the absolute altitude values are of no interest, but only the incremental change in the altitude is of interest.

Mathematically, the measurements may be presented as follows:

$$M_k(t_i) = \text{Altitude}(k,t_i) + \text{Bias}(k) + \text{Noise}(k,t_i)$$

where
- $M_k(t_i)$ is the altitude measurement from sensor k at the epoch $t_i$;
- Altitude($k,t_i$) is the true altitude of sensor k at the epoch $t_i$;
- Bias(k) is the constant bias in the estimate; and
- Noise($k,t_i$) is the random noise.

These altitude measurements are the observables under consideration. The delta observables can be constructed as follows:

$$\text{delta}M_k(t_i) = M_k(t_i) - M_k(t_{i-1})$$

$$\text{delta}M_k(t_i) = \text{Altitude}(k,t_i) + \text{Bias}(k) + \text{Noise}(k,t_i) - \text{Altitude}(k,t_{i-1}) - \text{Bias}(k) - \text{Noise}(k,t_{i-1})$$

The unknown bias term cancels out, in a similar manner as the ambiguity term in the delta-carrier-phase processing for GNSS receivers, as explained above. What remains is the actual difference in altitude and remaining random noise.

As a result, delta$M_k(t_i)$ is an estimate of Altitude($k,t_i$)−Altitude($k,t_{i-1}$), i.e. of deltaAltitude($k,t_i$).

In order to maintain higher precision and small noise of the solution, the final deltaAltitude($t_i$) is computed by averaging the deltaAltitude from all four sensors:

$$\text{deltaAltitude}(t_i) = \frac{1}{4} \sum_{k=1}^{4} \text{deltaAltitude}(k, t_i)$$

The final altitude change over time, hereinafter called "altitude trajectory", may be computed by adding the altitude increments:

$$\text{altitudeChange}(t_m) = \sum_{i=2}^{m} \text{deltaAltitude}(t_i)$$

The summation starts from index 2, because the deltaAltitude cannot be computed at epoch 1.

The following techniques will be discussed below:

Technique A: "DefaultMode"—delta-observables processing without applying any embodiment of the invention and without applying any outlier detection technique.

Technique B: "OutlierDetection"—a simple scheme is used without applying any embodiment of the invention but using an outlier detection technique. The delta observable with the largest absolute value is identified as a potential outlier. If the absolute value of the delta observable that was identified as a potential outlier is greater than a threshold, this measurement is isolated, i.e. not used in delta-observation averaging. For the sake of simplicity, a threshold is selected being slightly smaller than the jerks (outliers) that are introduced into the data for the experiment.

Technique C: "BackResid-1.0"—applying a fixed back-residual coefficient value being equal to 1.0, in accordance with an embodiment of the invention (as explained above for example with reference to steps s20, s30, and s50 of FIG. 1).

Technique D: "BackResid-smaller-than-1.0"—applying a fixed back-residual coefficient value being smaller than 1.0, in accordance with an embodiment of the invention (as explained above for example with reference to steps s20, s30, and s50 of FIG. 1).

Technique E: "SyntheticResiduals"—computing synthetic residuals for delta observables, which were identified as outliers, in accordance with an embodiment of the invention (as explained above with reference to steps s9a of FIGS. 6, 8, 9, and 10).

Technique F: "OutliernessAndPersistenceCheck"—resetting previous residuals when confronted with large or persistent outliers, in accordance with an embodiment of the invention (as explained above with reference to FIG. 10). The outlierness threshold is selected as being about half of the expected jerks (outliers) and the persistence threshold is selected as being 5 epochs.

Figure 11A:
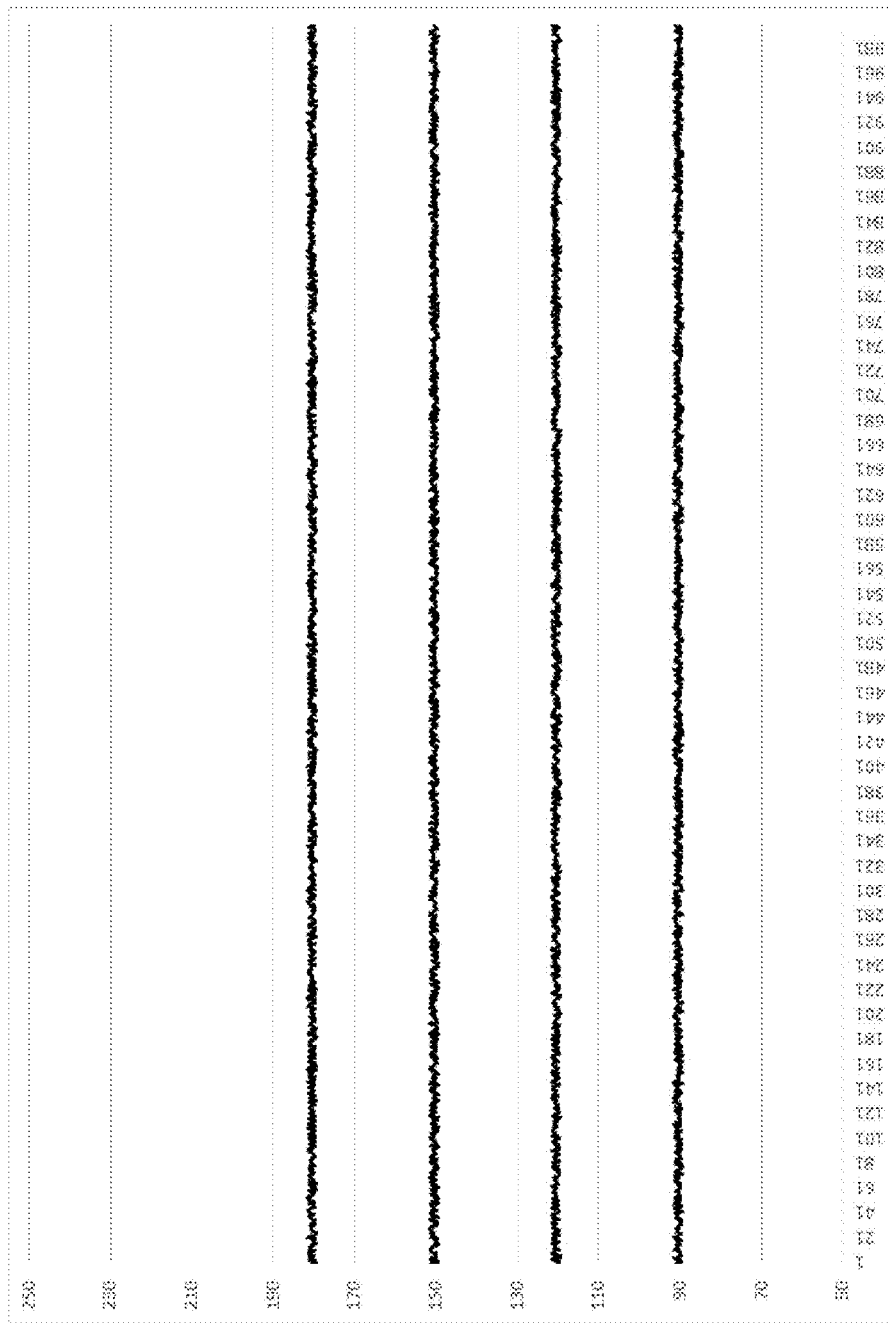
FIG. 11a shows altitude measurements over time from four static sensors in an exemplary situation in which ground stability is monitored, on the basis of which benefits of some embodiments of the invention are discussed.

FIG. 11a shows the measurements from the above-referred four sensors. The horizontal axis corresponds to time. 1000 epochs are shown in this plot. If, for example, an epoch is one second, then the horizontal axis would correspond to 1000 seconds. Other epoch intervals may be chosen. The vertical axis corresponds to the measured altitude.

Figure 11B:
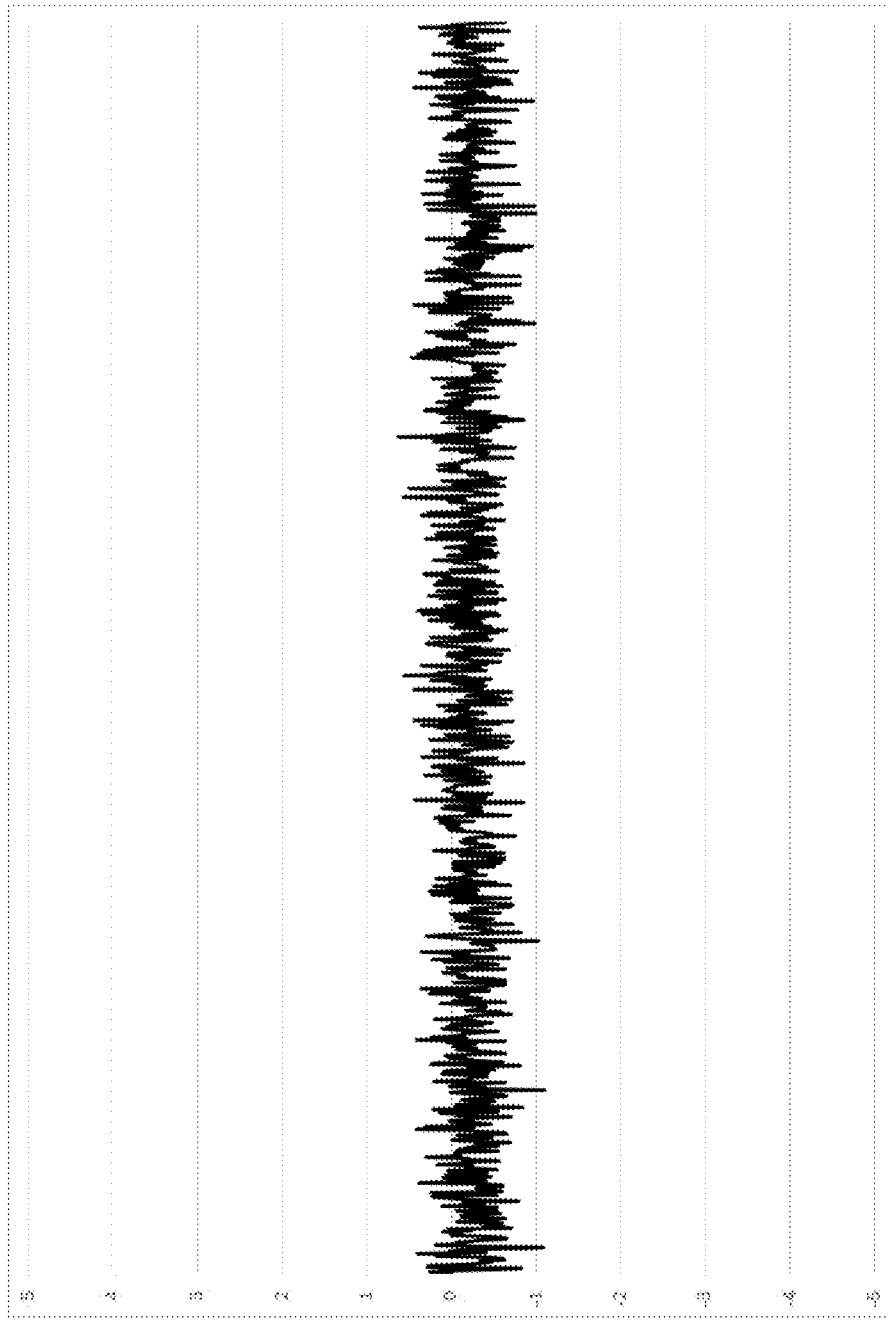
FIG. 11b shows the trajectory obtained by processing the data shown in FIG. 11a with below-described technique A, i.e. "DefaultMode", in a non-claimed reference implementation.

FIG. 11b shows the trajectory obtained by processing the data shown in FIG. 11a with the above-described technique A, i.e. "DefaultMode". One can observe, as expected, a low-noise trajectory without any divergence, which corresponds to the clean data shown in FIG. 11a.

Now, let us illustrate the potential need for outlier detection and isolation.

Figure 12A:
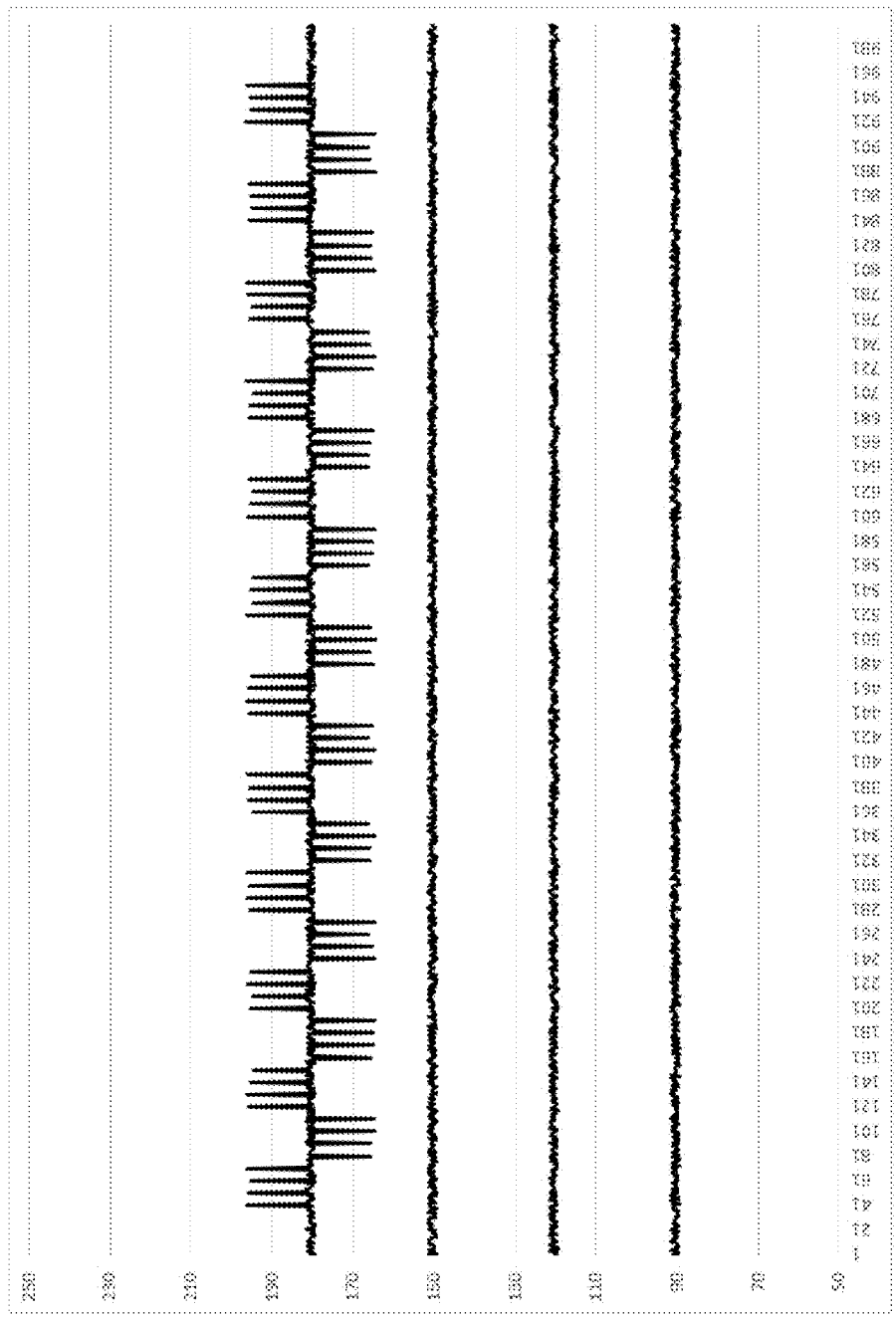
FIG. 12a shows altitude measurements over time from the above-referred four sensors but with one of the sensors now affected by outliers, on the basis of which benefits of some embodiments of the invention are discussed.

FIG. 12a shows the measurements from the above-referred four sensors but with one of the sensors now affected by outliers (visible as sudden spikes in the estimate).

Figure 12B:
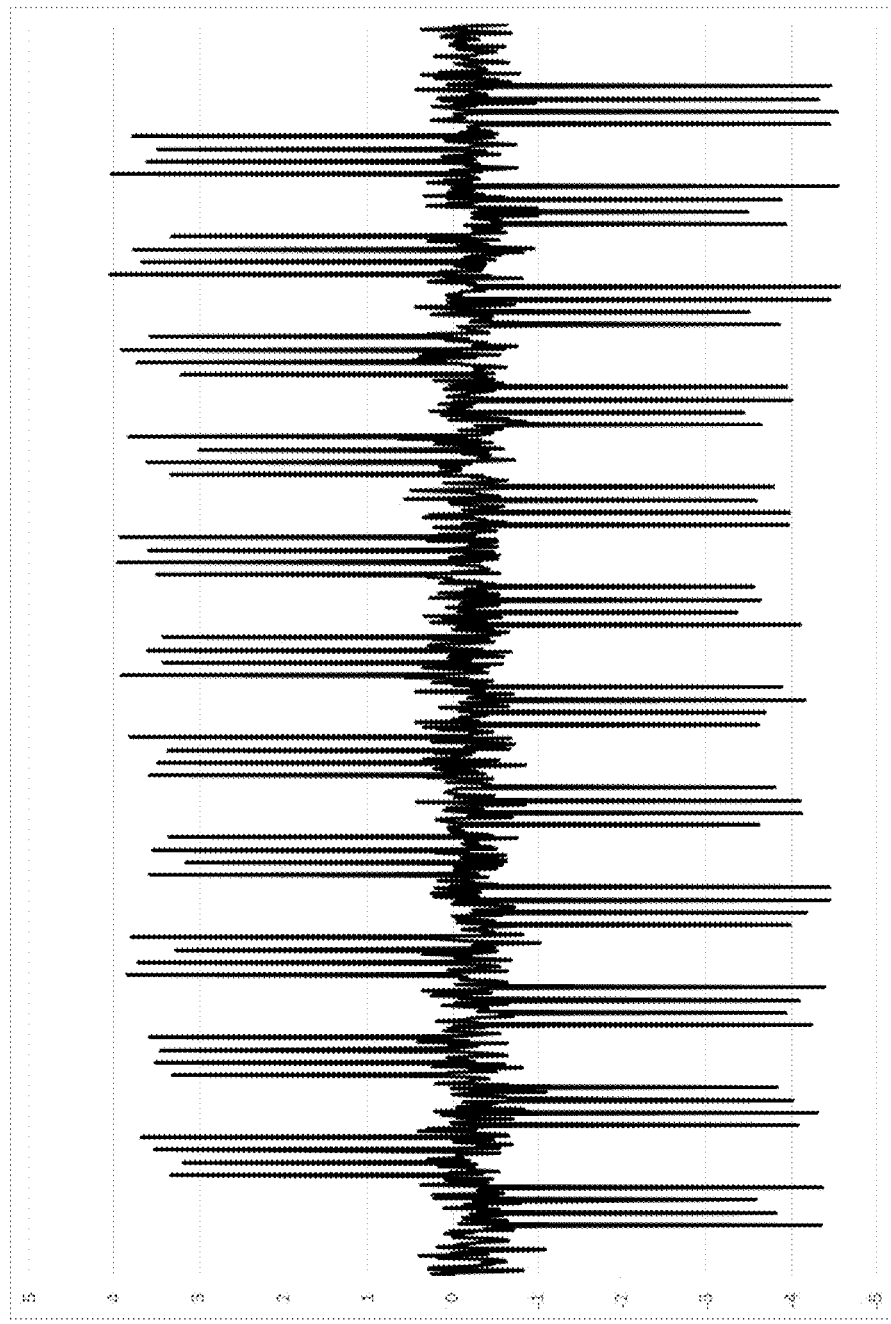
FIG. 12b shows the trajectory obtained by processing the data shown in FIG. 12a with below-described technique A, i.e. "DefaultMode", in a non-claimed reference implementation.

FIG. 12b shows the trajectory obtained by processing and combining the data from all four sensors shown in FIG. 12a with the above-described technique A, i.e. "DefaultMode".

Figure 12C:
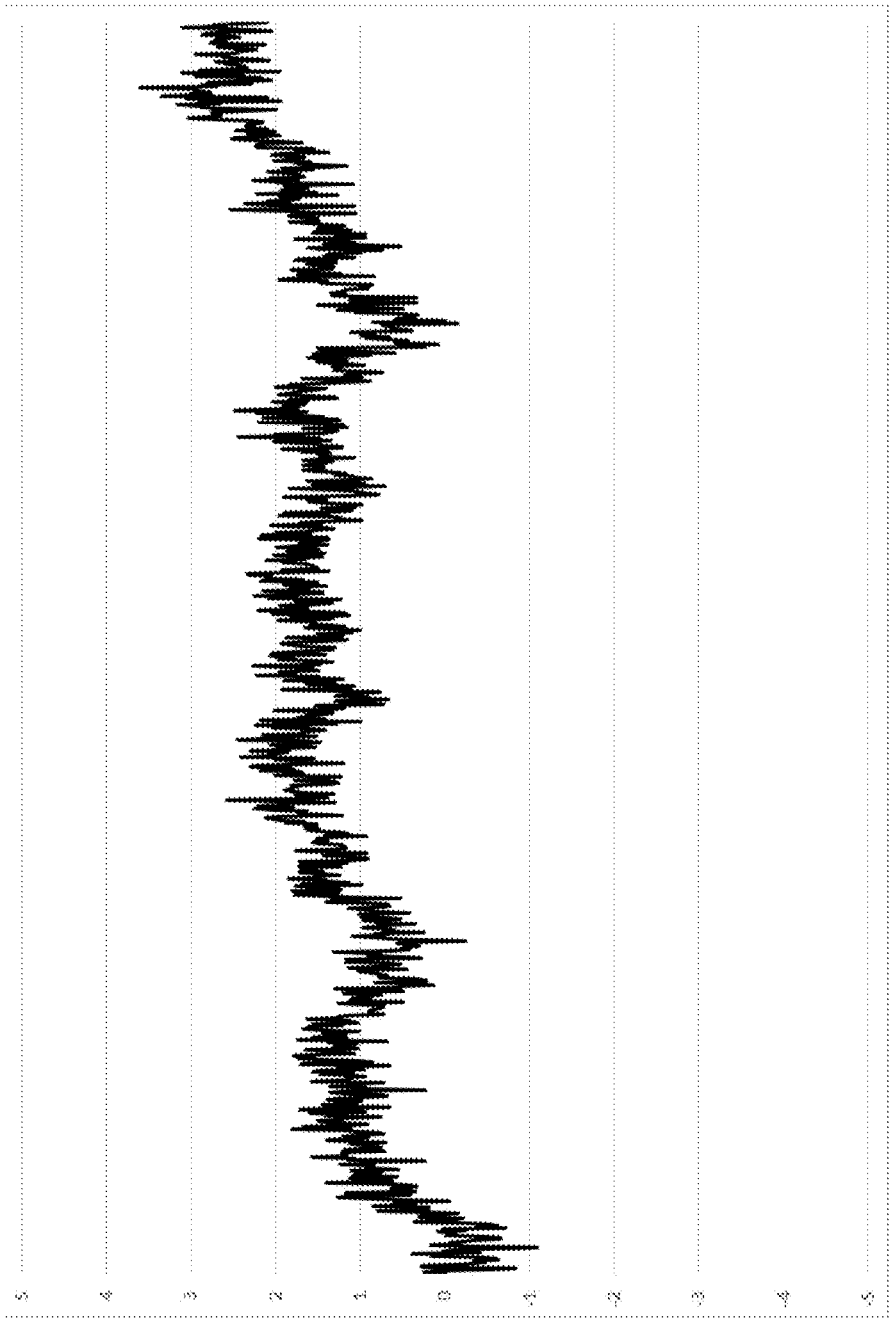
FIG. 12c shows the trajectory obtained by processing the data shown in FIG. 12a with below-described technique B, i.e. "OutlierDetection" (a simple outlier detection technique), in a non-claimed reference implementation.

FIG. 12c shows the trajectory obtained by processing the data shown in FIG. 12a with the above-described technique B, i.e. "OutlierDetection". It can be observed that such a simple outlier detection technique allows outlier detection and isolation and the solution became smoother and more precise, without any jerks. However, isolating multiple outliers causes periodical geometry changes, which may lead to some random-walk divergence of the estimated altitude trajectory.

Figure 12D:
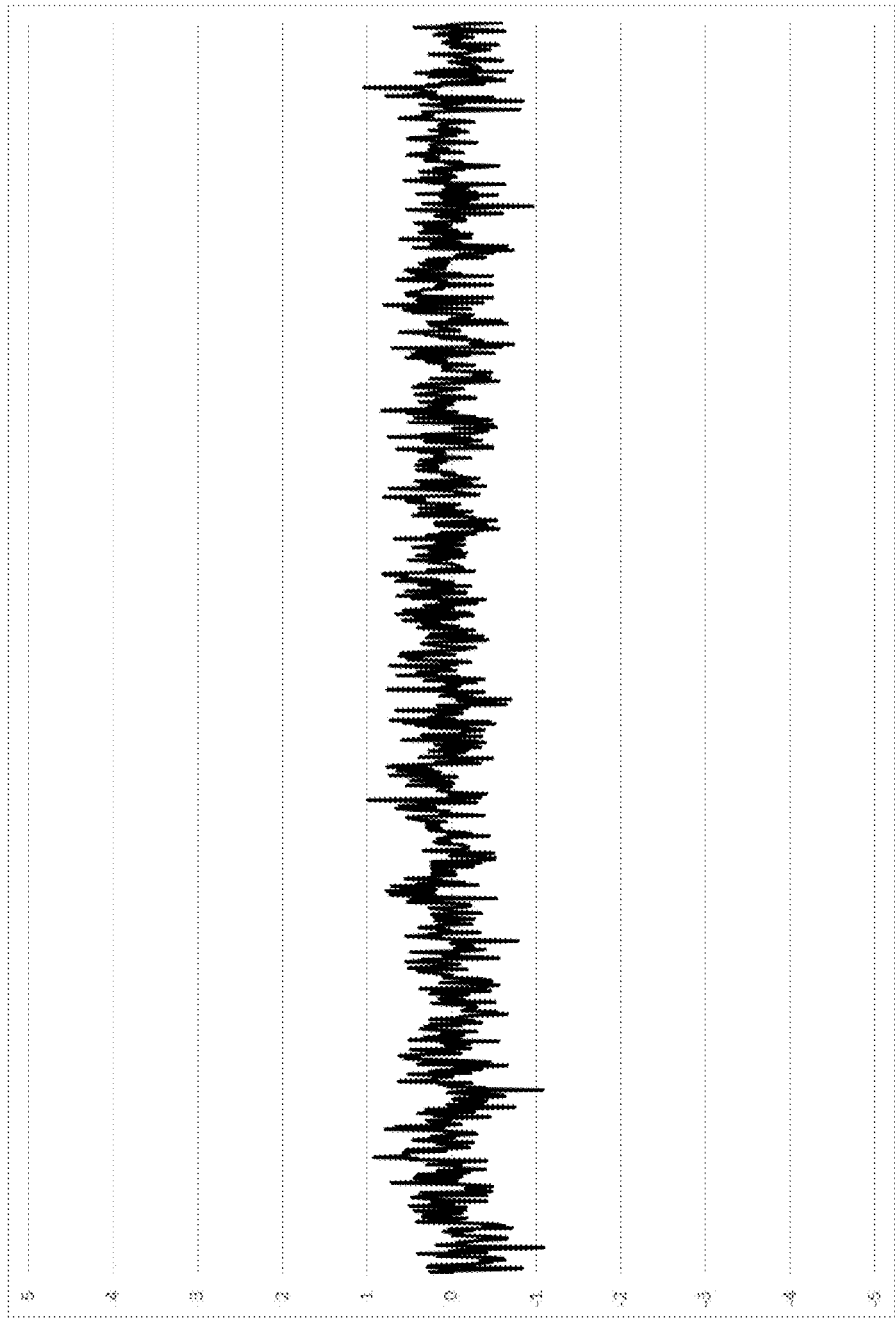
FIG. 12d shows the trajectory obtained by processing the data shown in FIG. 12a with below-described techniques B and C being combined, i.e. "OutlierDetection" and "Back-Resid-1.0", in one embodiment of the invention.

FIG. 12d shows the trajectory obtained by processing the data shown in FIG. 12a with the above-described techniques B and C being combined, i.e. "OutlierDetection" and "BackResid-1.0" combined. It can be observed that the combined use of these two techniques solves the divergence problem and yet allows to maintain a smooth altitude trajectory without jerks. This typically allows greatly improved accuracy of the seismic monitoring used in this example.

Let us know consider the processing of more difficult input data sets.

Figure 13A:
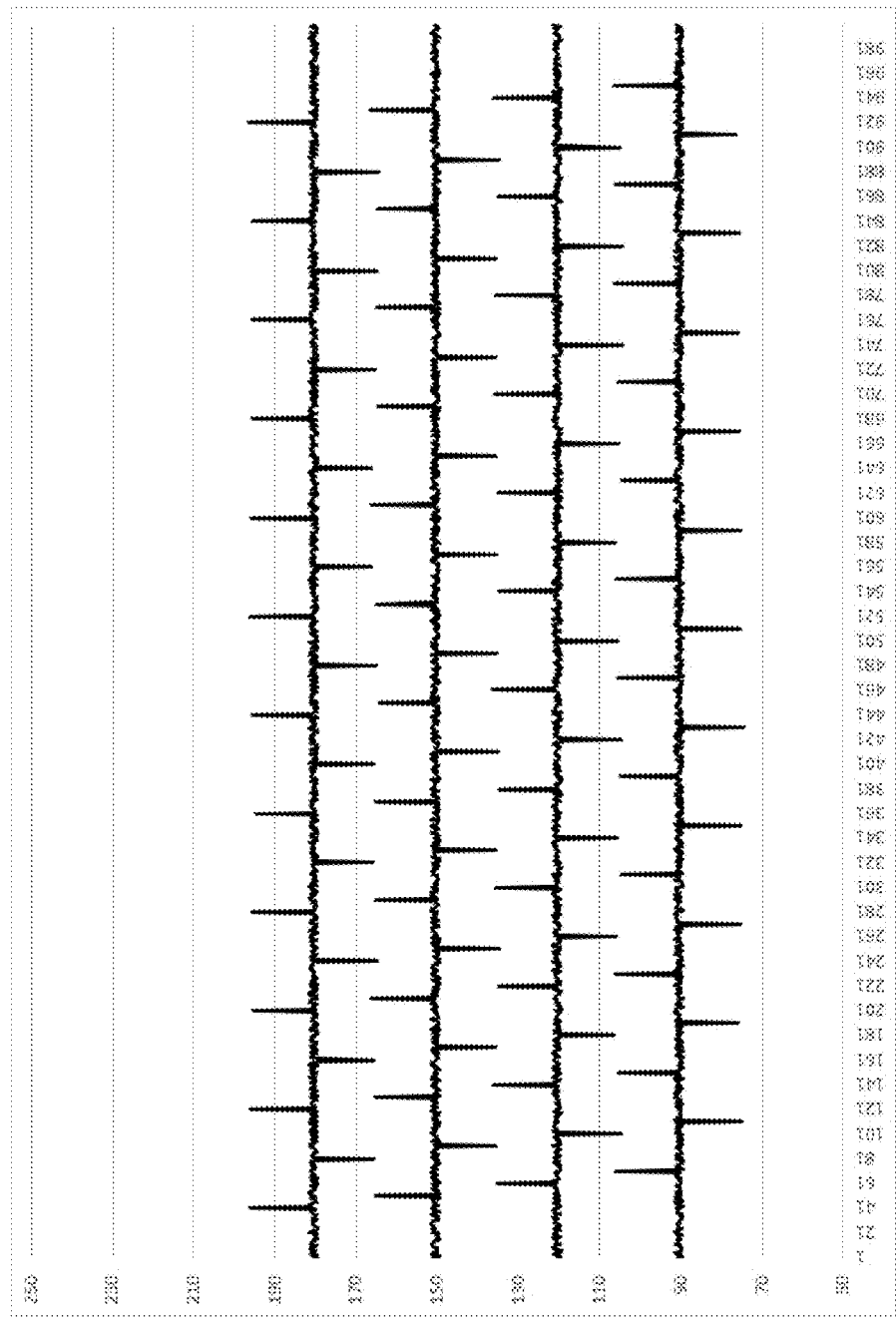
FIG. 13a shows altitude measurements over time from the above-referred four sensors but with all sensors being affected by outliers, on the basis of which benefits of some embodiments of the invention are discussed.

FIG. 13a shows the measurements from the above-referred four sensors but this time with all sensors being affected by outliers (again, visible as sudden spikes in the estimate).

Figure 13B:
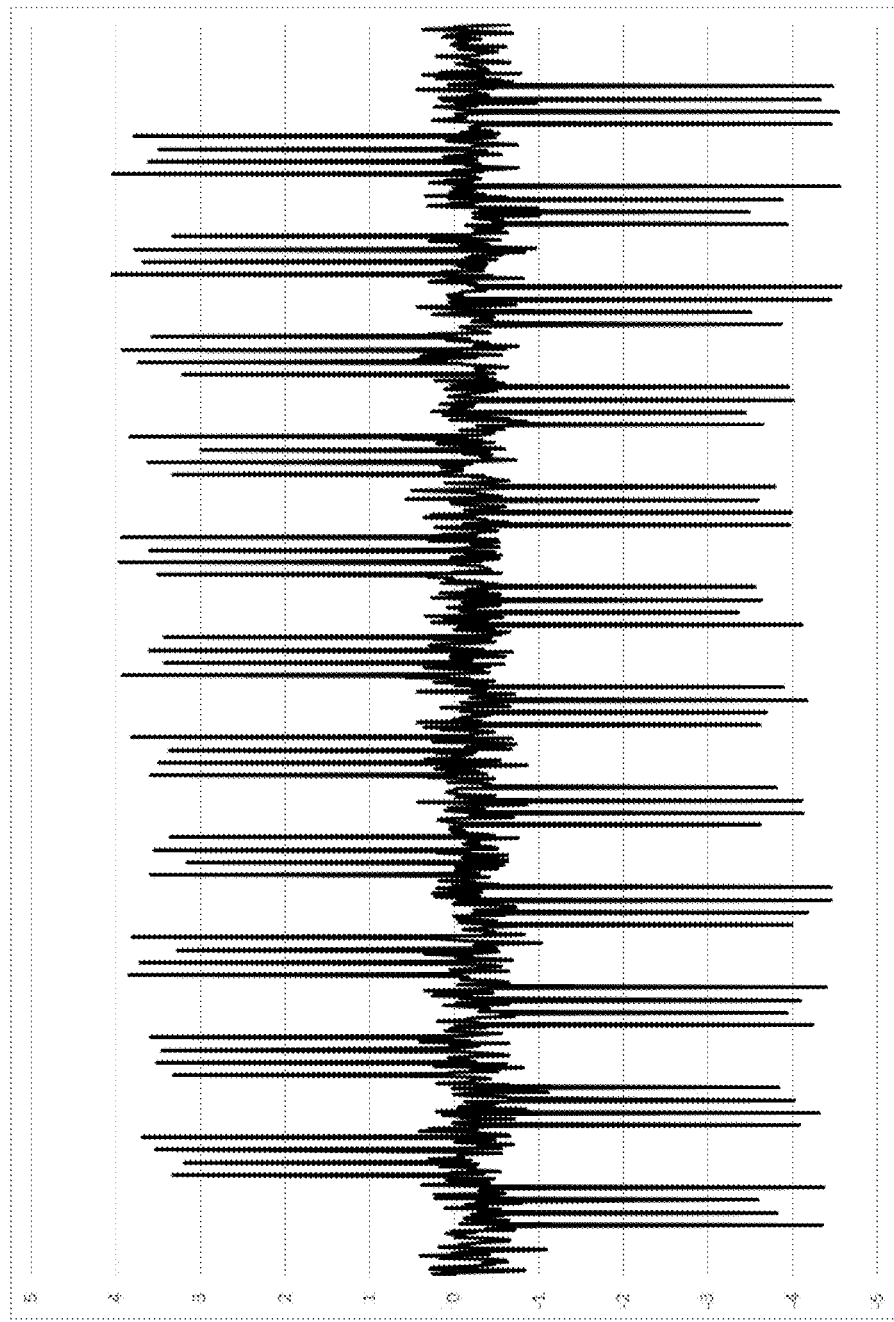
FIG. 13b shows the trajectory obtained by processing the data shown in FIG. 13a with below-described technique A, i.e. "DefaultMode", in a non-claimed reference implementation.

FIG. 13b shows the trajectory obtained by processing and combining the data from all four sensors as shown in FIG. 13a with the above-described technique A, i.e. "DefaultMode".

Figure 13C:
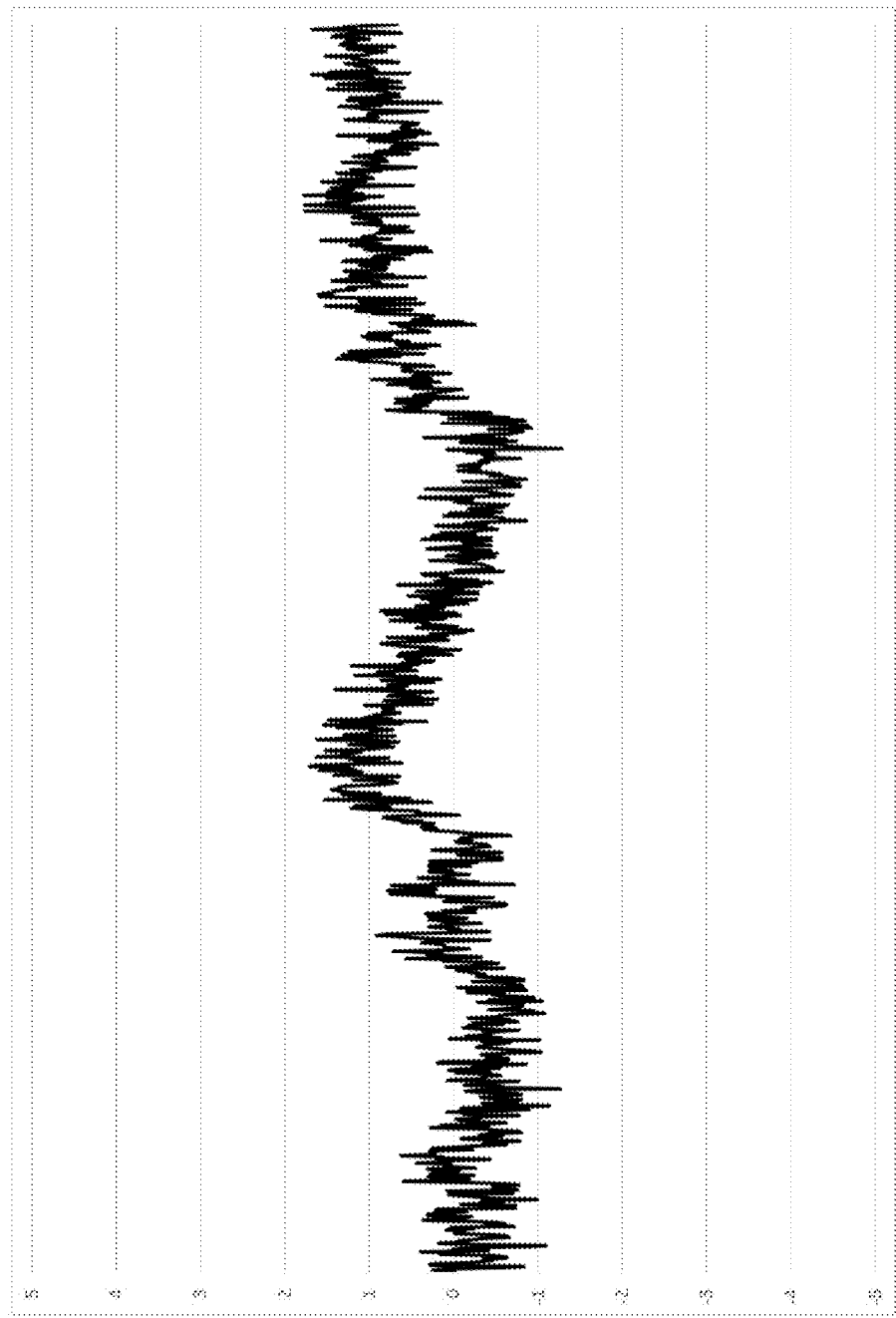
FIG. 13c shows the trajectory obtained by processing the data shown in FIG. 13a with below-described technique B, i.e. "OutlierDetection", in a non-claimed reference implementation.

FIG. 13c shows the trajectory obtained by processing the data shown in FIG. 13a with the above-described technique B, i.e. "OutlierDetection".

Figure 13D:
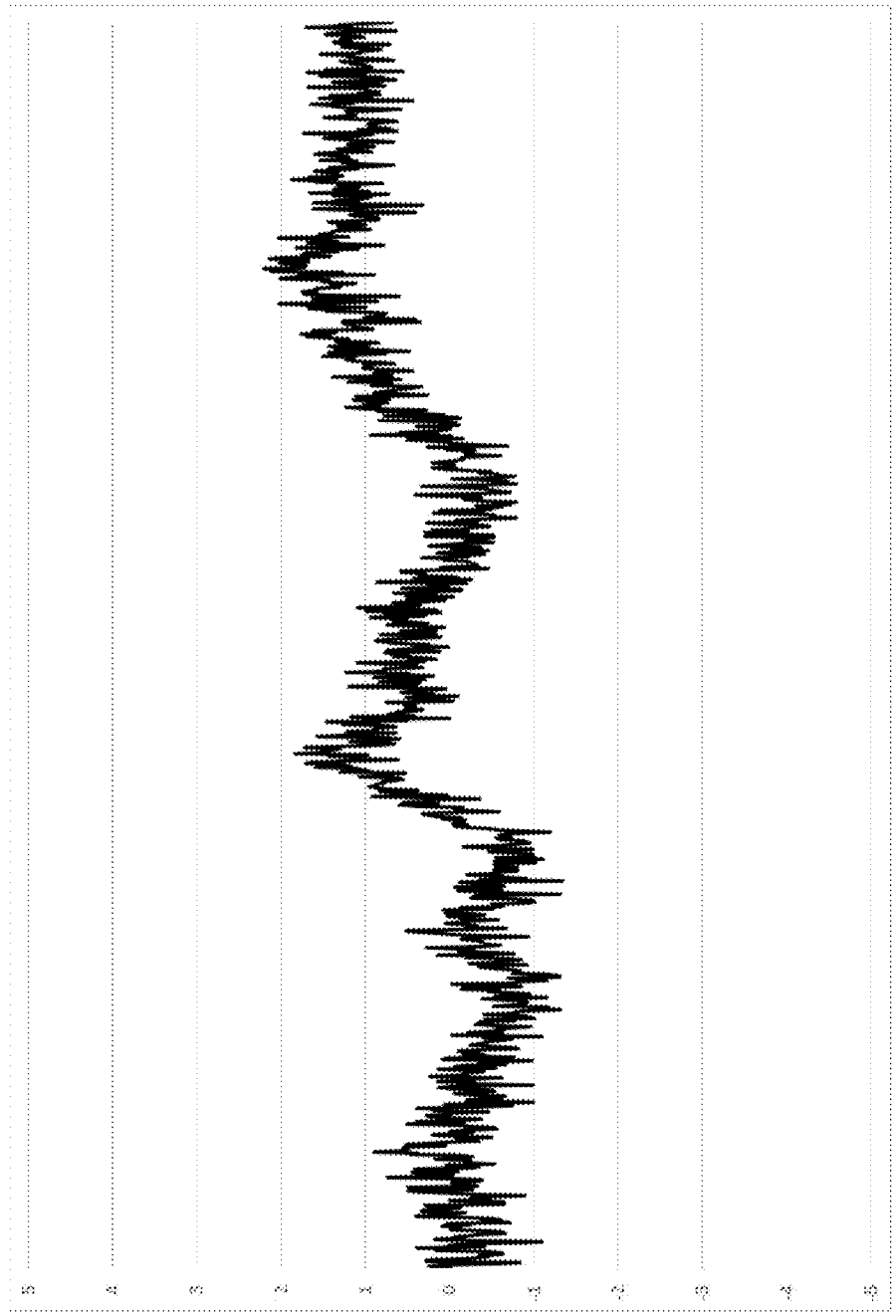
FIG. 13d shows the trajectory obtained by processing the data shown in FIG. 13a with below-described techniques B and C being combined, i.e. "OutlierDetection" and "Back-Resid-1.0", in one embodiment of the invention.

FIG. 13d shows the trajectory obtained by processing the data shown in FIG. 13a with the above-described techniques B and C being combined, i.e. "OutlierDetection" and "BackResid-1.0" combined. It can be observed that, although previous residuals were applied (as described for example with reference to steps s20, s30 and s50 of FIG. 1), some divergence is still visible.

Figure 13E:
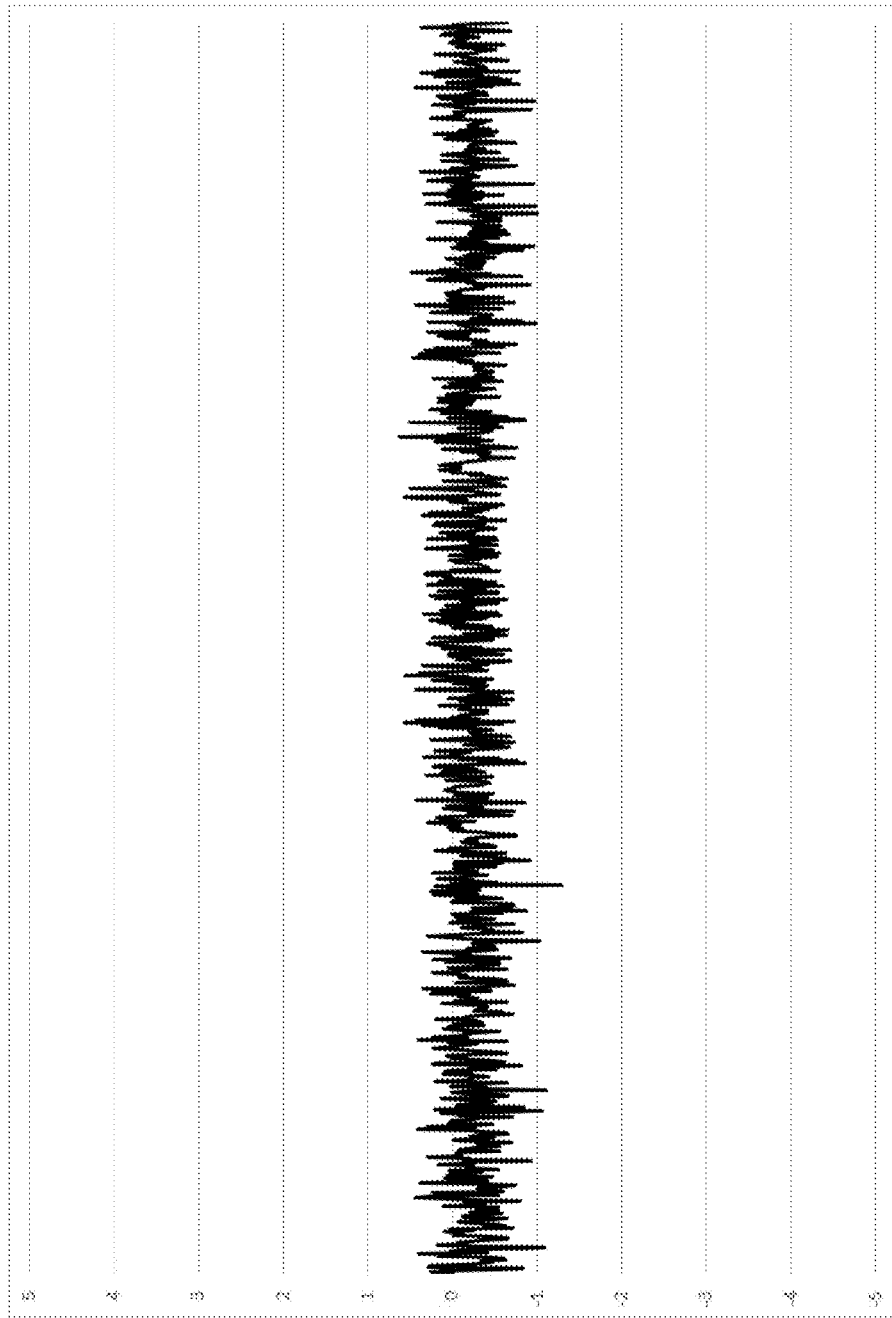
FIG. 13e shows the trajectory obtained by processing the data shown in FIG. 13a with below-described techniques B, C, and E being combined, i.e. "OutlierDetection", "Back-Resid-1.0", and "SyntheticResiduals", in one embodiment of the invention.

FIG. 13e shows the trajectory obtained by processing the data shown in FIG. 13a with the above-described techniques B, C, and E being combined, i.e. "OutlierDetection", "BackResid-1.0", and "SyntheticResiduals" being combined. It can be observed that the divergence of the resultant trajectory is mitigated thanks to the use of the "SyntheticResiduals" technique combined with the other two techniques.

Let us know consider the processing of yet more difficult input data sets, so as to demonstrate the benefit of some of the other above-referred techniques in accordance with some embodiments of the invention.

Let us assume now that the equipment (i.e., each of the above-referred four sensors) may slip. That is, the measured altitude may change, while this has nothing to do with a change in the ground level. This is similar to a cycle slip in the carrier phase for a GNSS receiver, when carrier phase value changes by an integer number of cycles (as explained for example in reference [1], section 7.1.2).

Figure 14A:
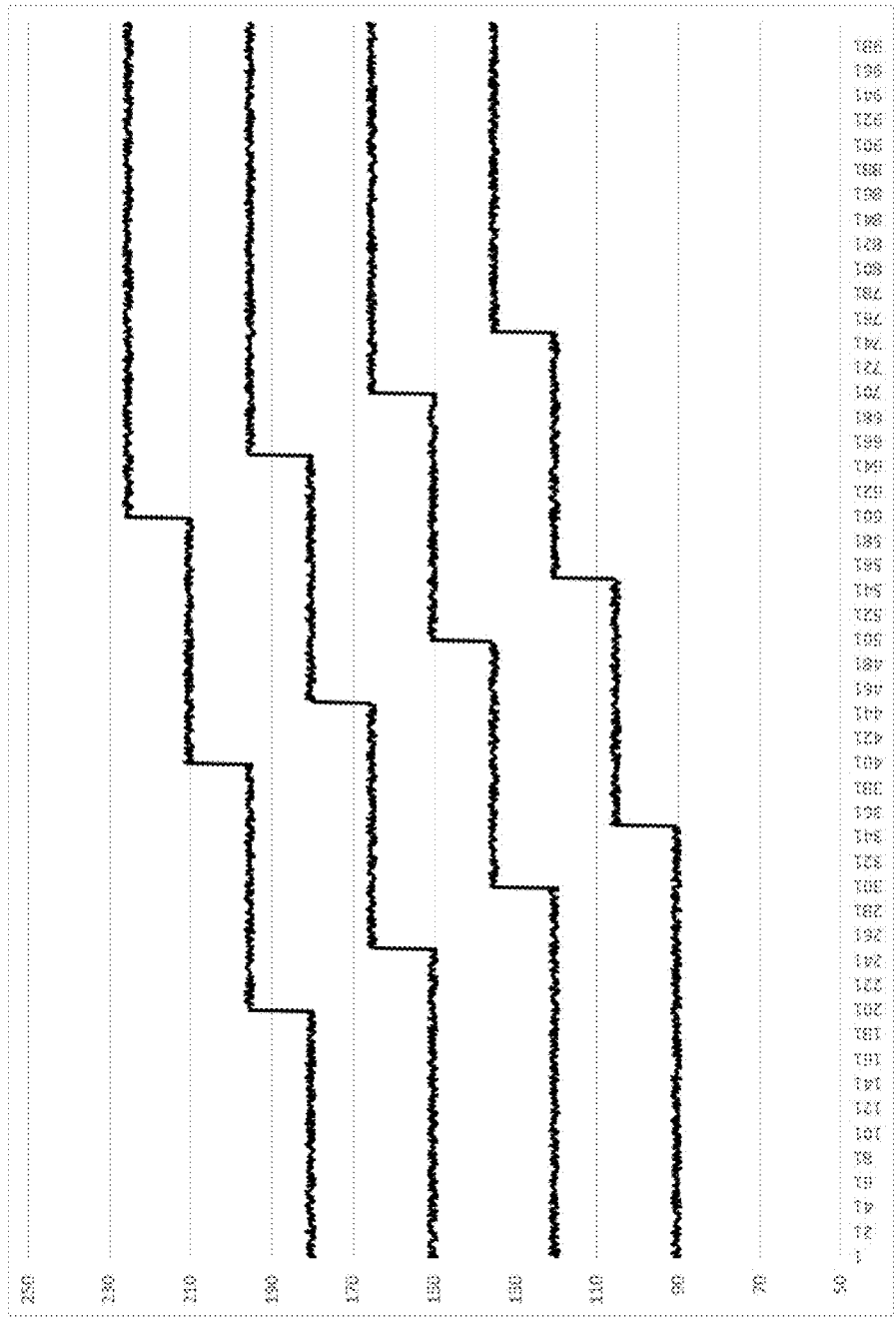
FIG. 14a shows altitude measurements over time from the above-referred four sensors but with some slips being introduced, on the basis of which benefits of some embodiments of the invention are discussed.

FIG. 14a shows the measurements from the above-referred four sensors with some slips being introduced in the input data.

Figure 14B:
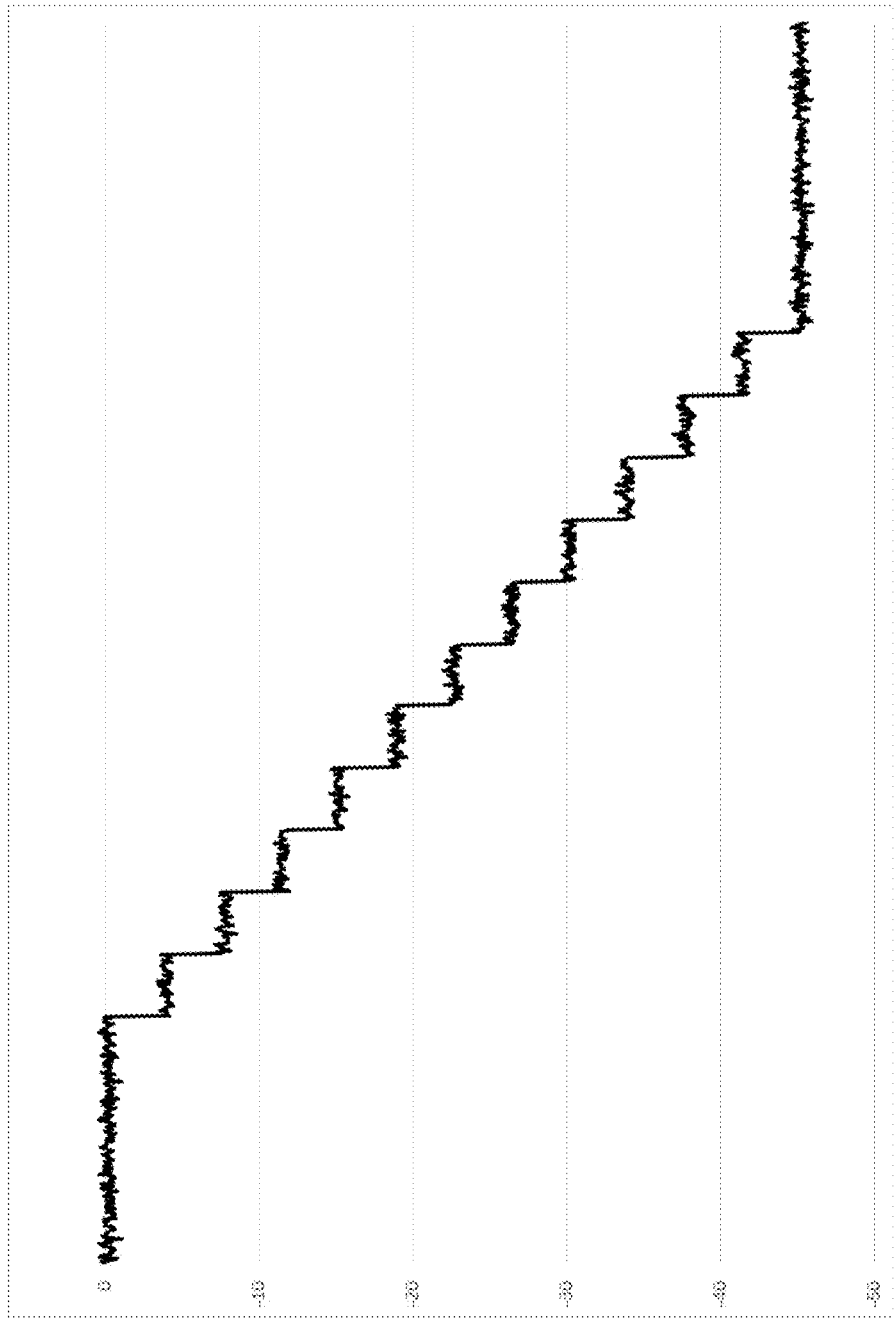
FIG. 14b shows the trajectory obtained by processing the data shown in FIG. 14a with below-described technique A, i.e. "DefaultMode", in a non-claimed reference implementation.

FIG. 14b shows the trajectory obtained by processing and combining the data from all four sensors shown in FIG. 14a with the above-described technique A, i.e. "DefaultMode".

Figure 14C:
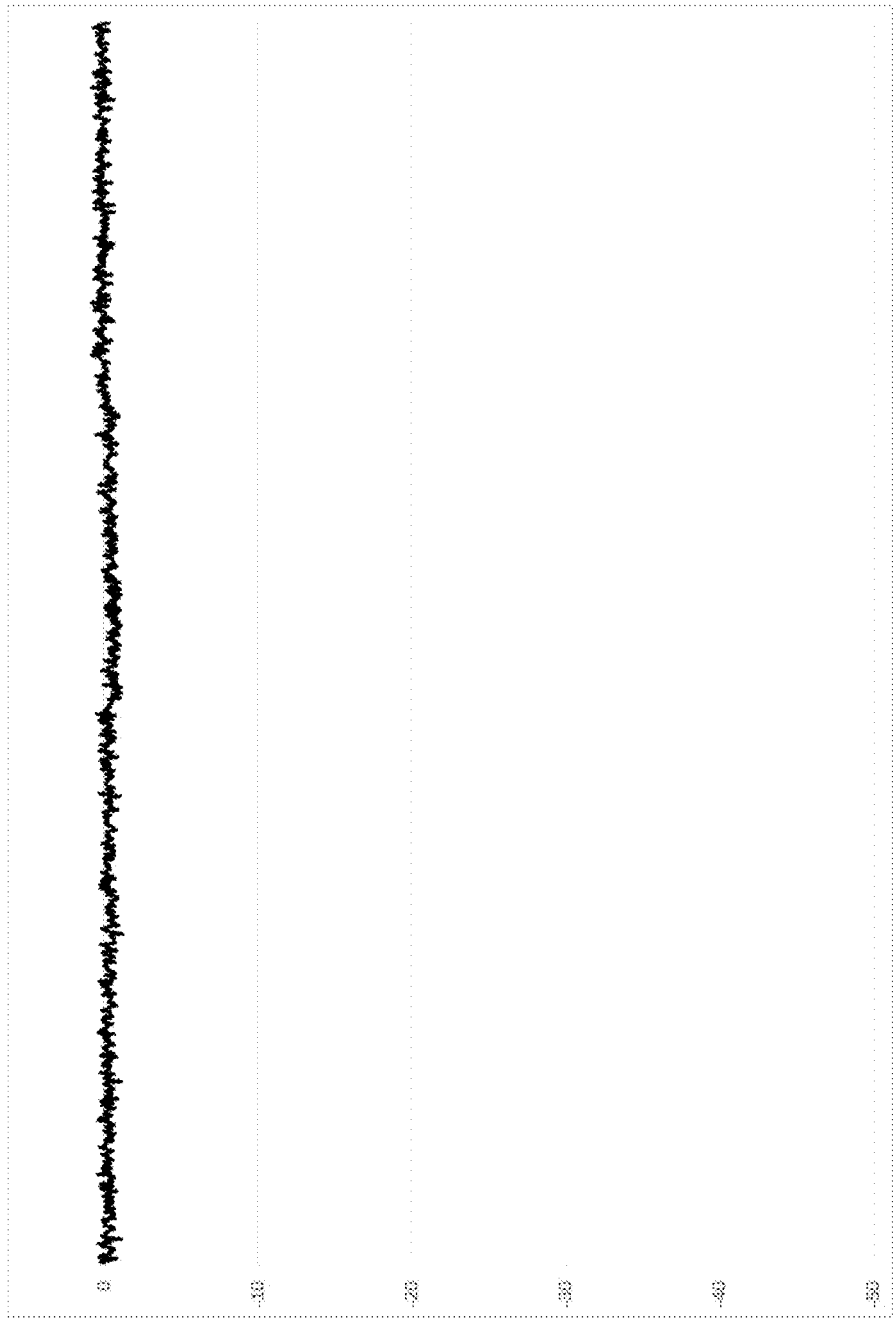
FIG. 14c shows the trajectory obtained by processing the data shown in FIG. 14a with below-described technique B, i.e. "OutlierDetection", in a non-claimed reference implementation.

FIG. 14c shows the trajectory obtained by processing the data shown in FIG. 14a with the above-described technique B, i.e. "OutlierDetection". It can be observed that outliers are suppressed. However, some random-walk trajectory behavior may still appear due to rapid geometry changes.

Figure 14D:
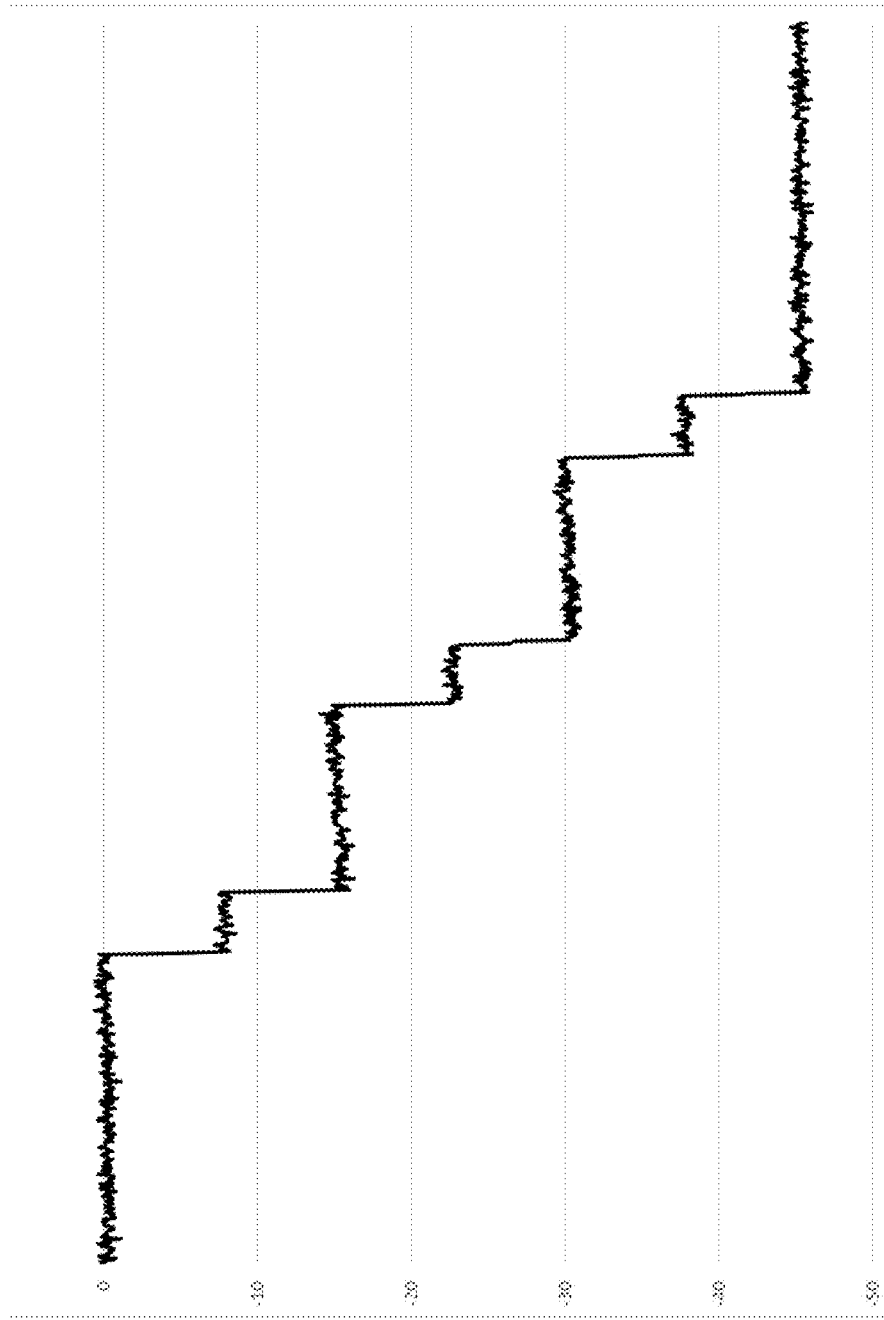
FIG. 14d shows the trajectory obtained by processing the data shown in FIG. 14a with below-described techniques B, C, and E being combined, i.e. "OutlierDetection", "Back-Resid-1.0", and "SyntheticResiduals", in one embodiment of the invention.

FIG. 14d shows the trajectory obtained by processing the data shown in FIG. 14a with the above-described techniques B, C, and E being combined, i.e. "OutlierDetection", "BackResid-1.0", and "SyntheticResiduals" being combined. It can be observed that the use of the "BackResid-1.0" technique together with "SyntheticResiduals" technique makes those outliers persistent, which may result in multiple outliers affecting the solution and may lead to a corruption of the trajectory estimation.

Figure 14E:
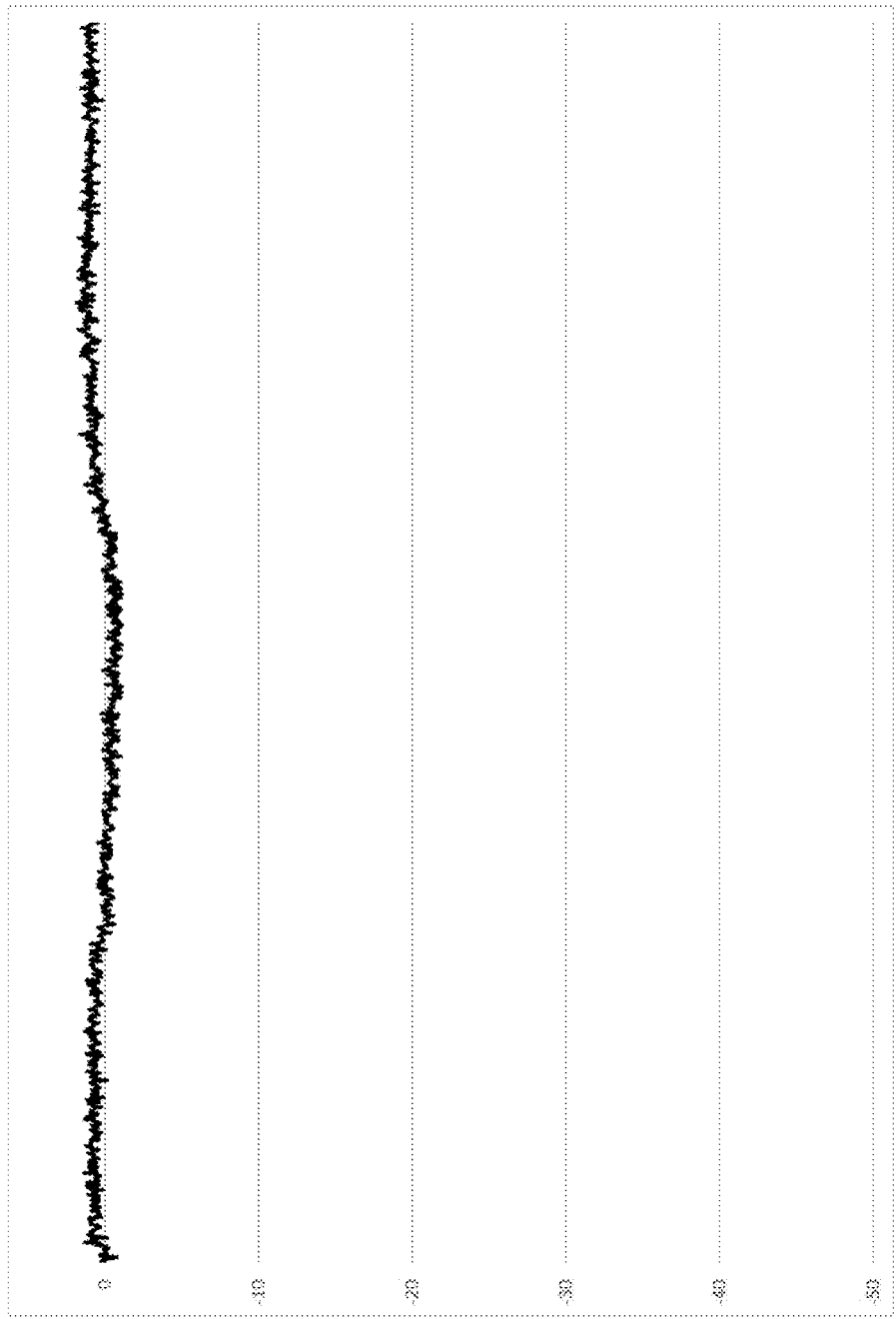
FIG. 14e shows the trajectory obtained by processing data shown in FIG. 14a with below-described techniques B, C, E, and F being combined, i.e. "OutlierDetection", "BackResid-1.0", "SyntheticResiduals", and "OutliernessAndPersistenceCheck", in one embodiment of the invention.

FIG. 14e shows the trajectory obtained by processing data shown in FIG. 14a with the above-described techniques B, C, E, and F being combined, i.e. "OutlierDetection", "BackResid-1.0", "SyntheticResiduals", and "OutliernessAndPersistenceCheck" being combined. This shows that resetting the previous residuals upon detection of large or persistent outliers is advantageous in that it does not allow those outliers to become persistent and prevents them from negatively affecting the trajectory estimates. The instant resetting of the previous residuals upon detection of large outliers is also advantageous in that it mitigates the negative effect of these outliers without having to wait for the effects of the persistence check.

In the examples discussed with reference to FIGS. 12b, 13d, 14d, and 14e, the back-residual coefficient value was set to 1.0, i.e. technique C ("BackResid-1.0") was used. However, selecting 1.0 as back-residual coefficient value may not always be optimal (as already discussed above). In order to illustrate the significance of appropriately selecting the back-residual coefficient value in some situations, a different example will now be considered in which measurements from sensors may drift. For GNSS equipment, such drifts may be caused by atmosphere change, satellite elevation change, or satellite clock. Let us assume that each of the above-referred four sensors are subject to drifting. For the sake of clarity, let us assume however that those drifts cancel out upon averaging solutions from the four sensors.

Figure 15A:
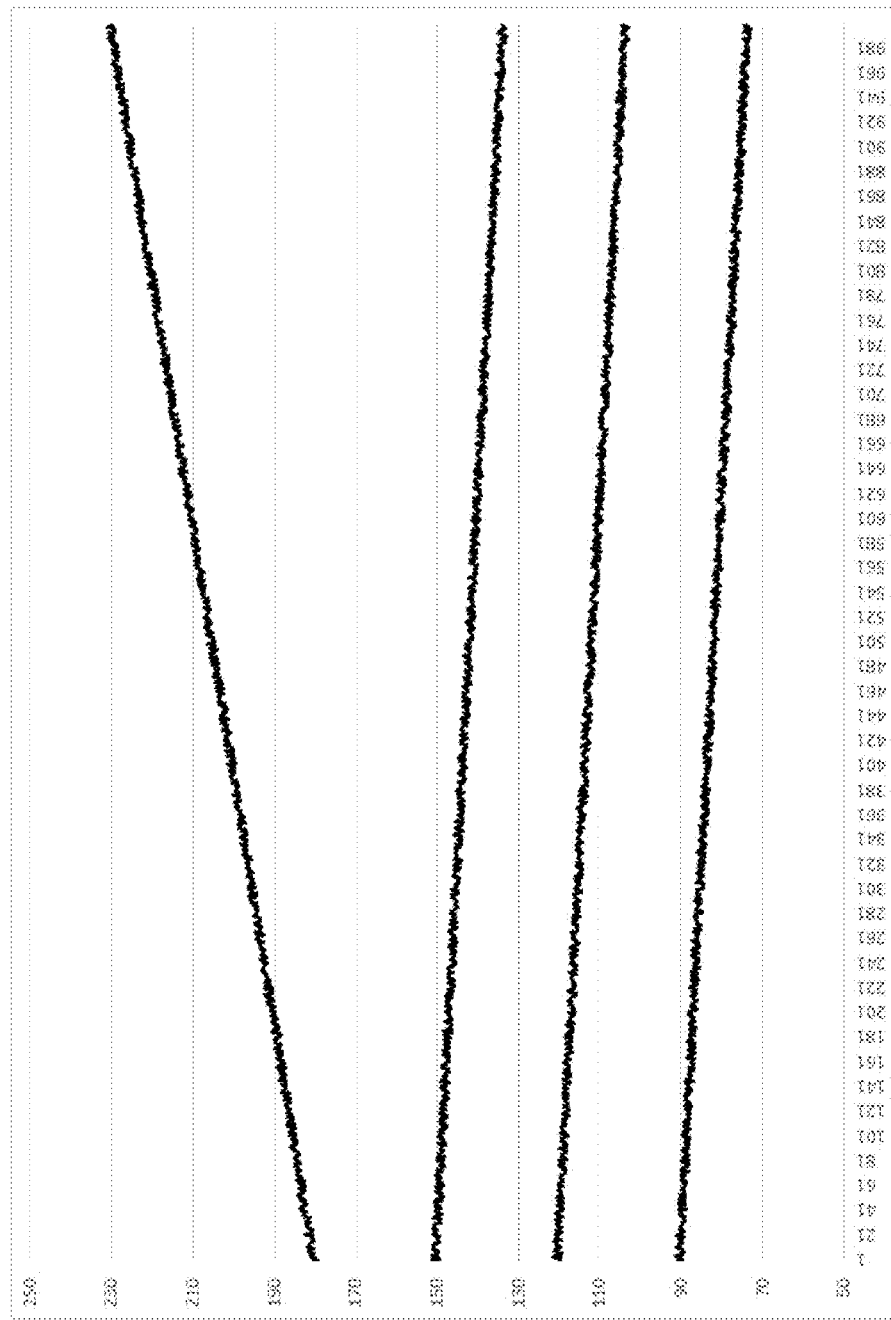
FIG. 15a shows altitude measurements over time from the above-referred four sensors but with the sensors being subject to drifting, on the basis of which benefits of some embodiments of the invention are discussed.

FIG. 15a shows the measurements from the above-referred four sensors being subject to drifting.

FIG. 15b shows the trajectory obtained by processing and combining the data from all four sensors shown in FIG. 15a with the above-described technique A, i.e. "DefaultMode". It can be observed that, as expected, a smooth trajectory is obtained as the introduced drifts from the four sensors cancel out.

FIG. 15c shows the trajectory obtained by processing the data shown in FIG. 15a with the above-described techniques B, C, E, and F being combined, i.e. "OutlierDetection", "BackResid-1.0", "SyntheticResiduals", and "OutliernessAndPersistenceCheck" being combined. It can be observed that, when using previous-residuals-based correction (as explained for example with reference to steps s20, s30, and s50 of FIG. 1) with drifting observables, these drifts may accumulate and may result in severe trajectory drifts.

Figure 15D:
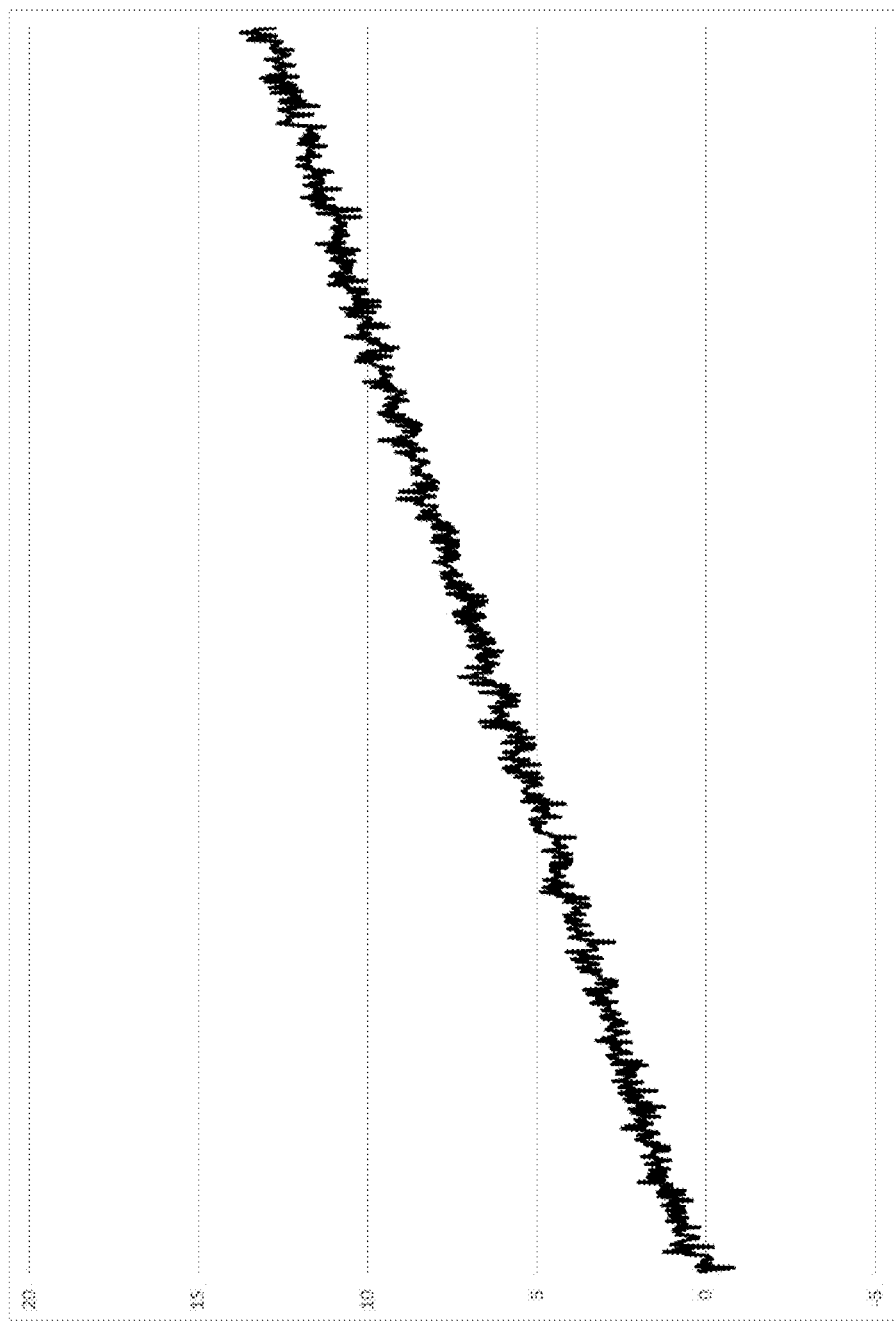
FIGS. 15d, 15e, and 15f show the trajectory obtained by processing the data shown in FIG. 15a with below-described techniques B, D, E, and F being combined, i.e. "OutlierDetection", "BackResid-smaller-than-1.0", "SyntheticResiduals", and "OutliernessAndPersistenceCheck", in three embodiments of the invention.
Figure 15E:
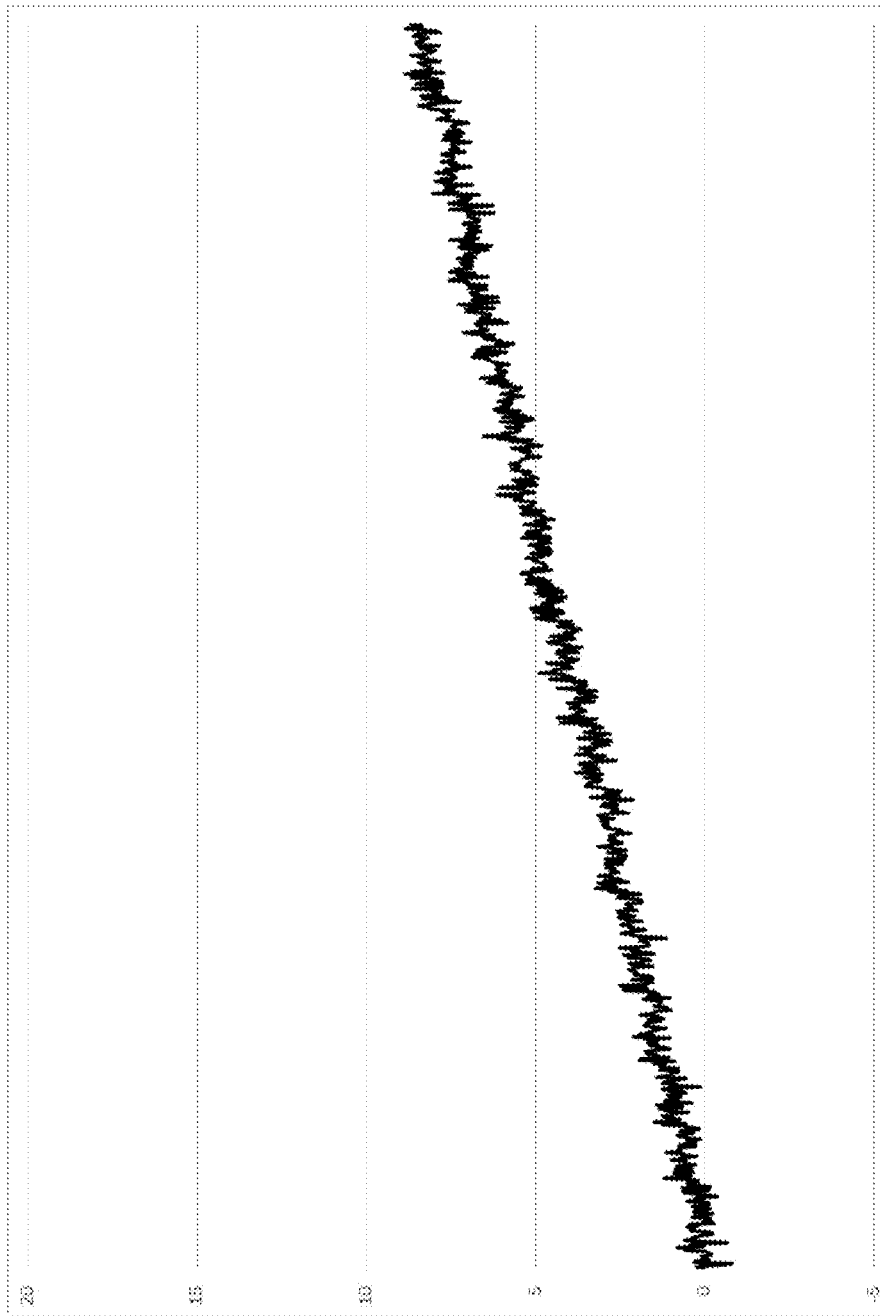
Figure 15F:
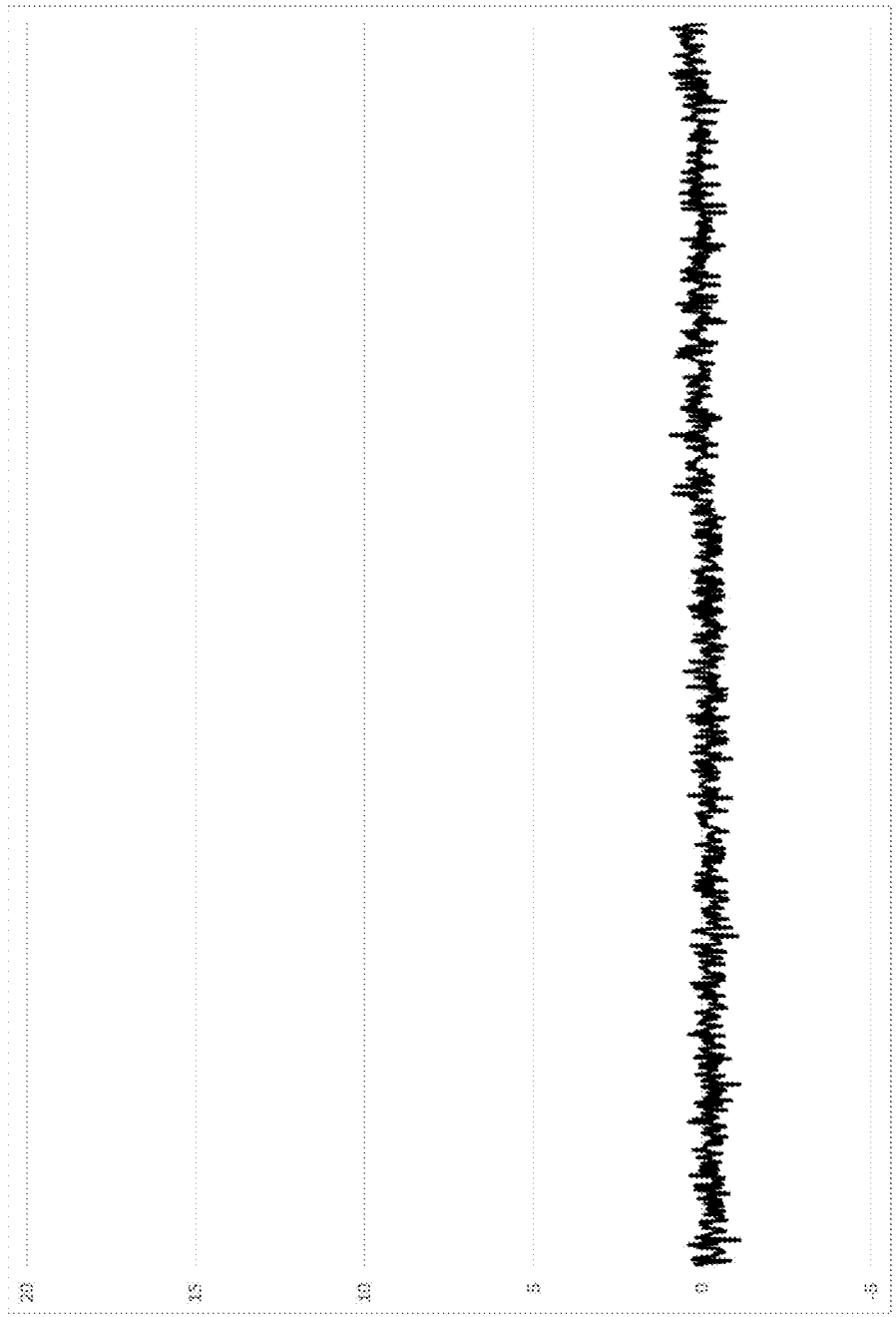

FIGS. 15d, 15e, and 15f show the trajectory obtained by processing the data shown in FIG. 15a with the above-described techniques B, D, E, and F being combined, i.e. "OutlierDetection", "BackResid-smaller-than-1.0", "SyntheticResiduals", and "OutliernessAndPersistenceCheck" being combined, with back-residual coefficient value equal to 0.98, 0.96, and 0.90 respectively (i.e., for FIG. 15d, the value is 0.98; for FIG. 15e, the value is 0.96; and for FIG. 15f, the value is 0.90). It can be observed that, with an appropriate back-residual coefficient value, the trajectory may return to normal, demonstrating a minimal remaining random-walk behavior.

An example based on real, field data will now be discussed with reference to FIGS. 16a to 16c. The input data was collected from a drive test which was performed in Sunnyvale, California, including going under overpasses and bridges, with considerable canopy and other obstructions along the trajectory. This resulted in a rapidly changing satellite geometry and rapidly changing satellite signal acquisition quality.

Figure 16A:
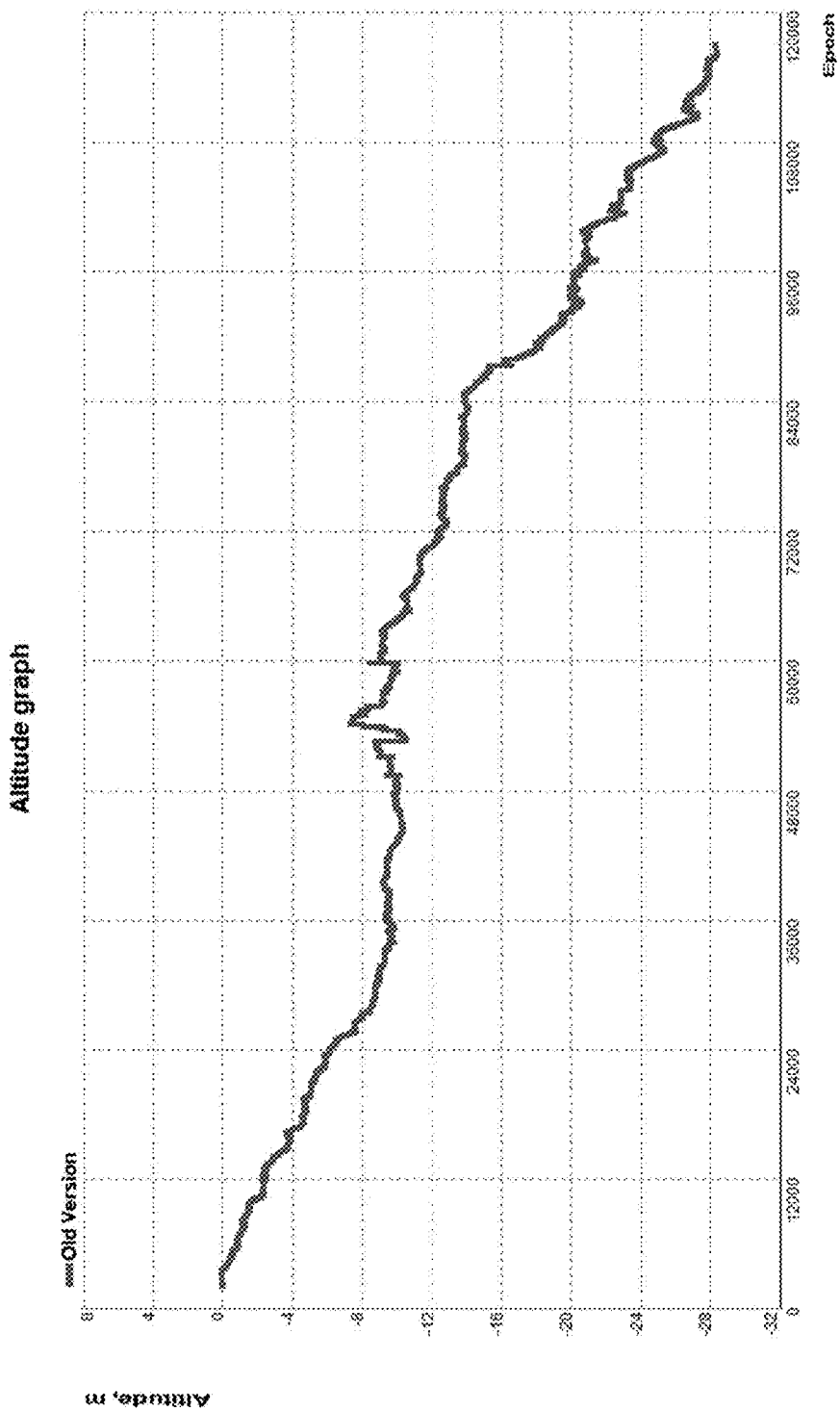
FIG. 16a shows the divergence of an exemplary trajectory computed based on real, field data stemming from a drive test performed in Sunnyvale, California, using a method in accordance with a non-claimed reference implementation.

The plots show the divergence of the trajectory computed with delta-phase and Doppler observables applying a method of processing delta-phase observables in one embodiment of the invention (labelled "New Method" in FIG. 16b) when dynamically adjusting the back-residual coefficient values, and a method in accordance with a non-claimed reference implementation (labelled "Old version" in FIG. 16a). FIG. 16c shows the estimated trajectory divergences of FIGS. 16a and 16b superimposed to illustrate the improvement achieved using the method in accordance with an embodiment of the invention compared to the method in accordance with the non-claimed reference implementation.

Figure 16B:
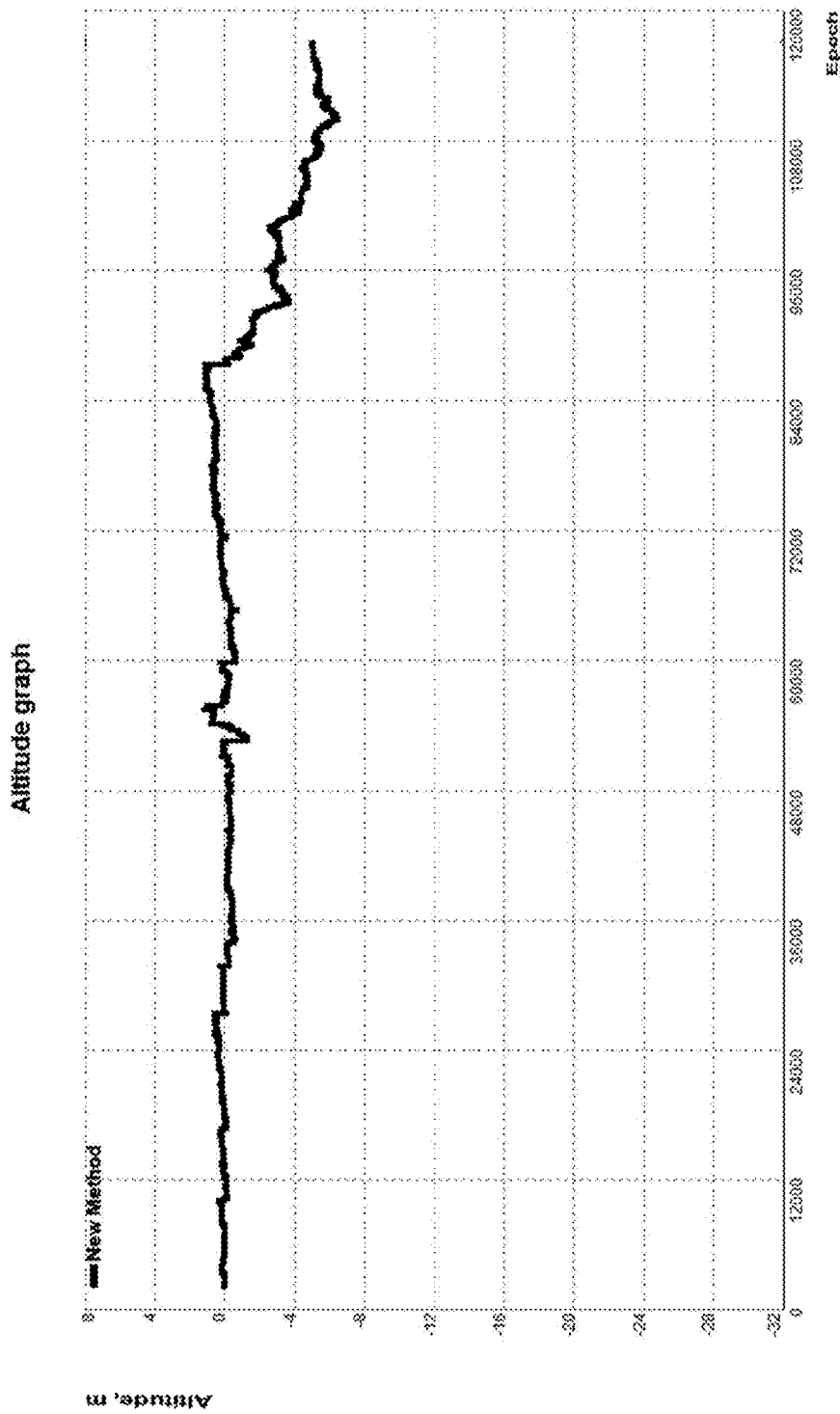
FIG. 16b show the trajectory divergence using the same input data as used for FIG. 16a but now applying a method of processing delta-phase observables in one embodiment of the invention.
Figure 16C:
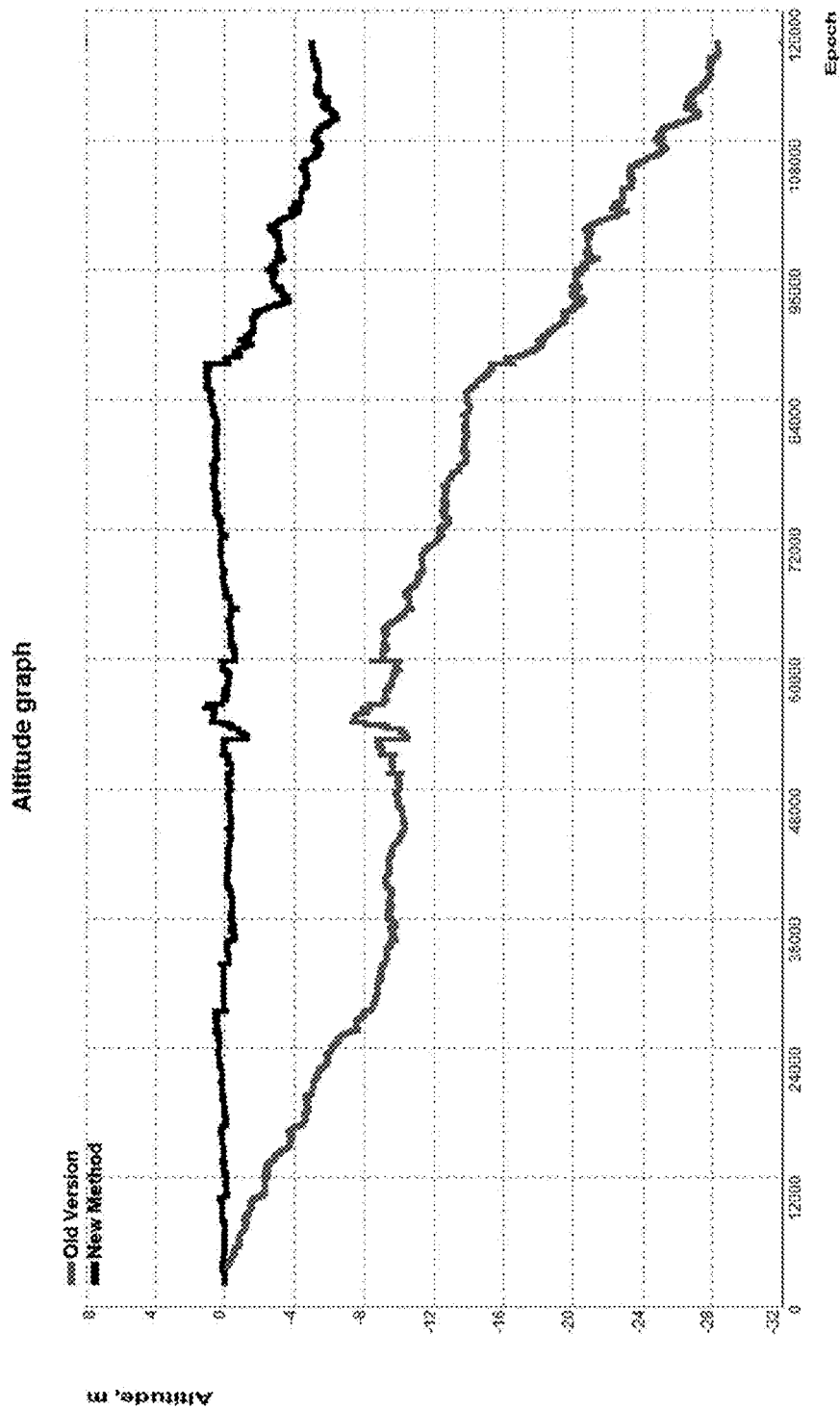
FIG. 16c superimposes the trajectory divergences of FIGS. 16a and 16b.

The method corresponding to FIG. 16b was carried out by a combination of estimating the observation drift and using adaptive (i.e., dynamically determined) back-residual coefficient values (as discussed for example with reference to steps s22 and s24 of FIG. 4), and performing outlierness and persistence checks and using estimator-driven synthetic previous residuals (as discussed for example with reference to steps s8c, s9a, and s30a of FIG. 10).

From the examples discussed with reference to FIGS. 11a to 16c, a skilled person would understand that methods in accordance with embodiments of the invention may use different parameters and mode of operations that may be selected depending on expected characteristics of the measurements. While a back-residual coefficient value 1.0 may be expected to generally provide optimal results for input data experiencing no divergence, a skilled person will recognize from the above discussion that, if a drift is expected in the input data, applying smaller back-residual coefficient values may be more appropriate, or, alternatively, determining an optimal back-residual coefficient value dynamically based on the estimated magnitude of expected drifts may be even more appropriate.

C. System

Figure 17:
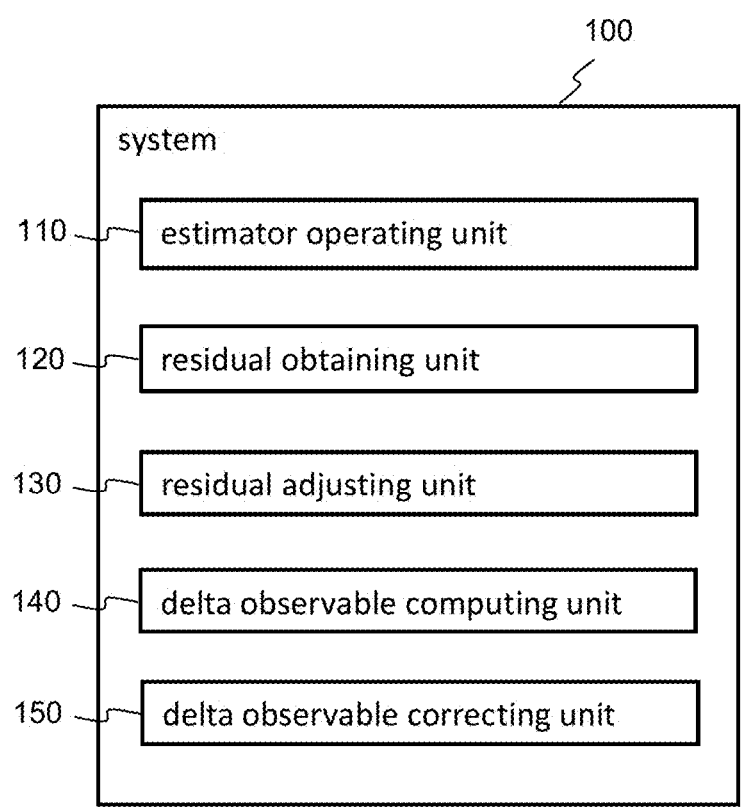
FIG. 17 schematically illustrates a system in one embodiment of the invention.

FIG. 17 schematically illustrates a system 100 in one embodiment of the invention. System 100 comprises an NSS receiver and/or a processing entity capable of receiving data from the NSS receiver. The system operates to estimate parameters derived from NSS signals useful to, i.e. suitable to, determine a position. The NSS receiver is configured for observing at least one NSS signal from each of a plurality of NSS satellites over multiple epochs. System 100 comprises an estimator operating unit 110, a residual obtaining unit 120, a residual adjusting unit 130, a delta observable computing unit 140, and a delta observable correcting unit 150.

Estimator operating unit 110 is configured for operating an estimation process, here referred to as "estimator", for a previous epoch (wherein the estimator uses state variables and computes the values of its state variables at least based on delta observables computed for the previous epoch). Residual obtaining unit 120 is configured for obtaining previous residuals from the estimator, each previous residual being associated with a delta observable computed for the previous epoch. Residual adjusting unit 130 is configured for, for each of at least some of the delta observables, adjusting the previous residual associated with the delta observable, wherein adjusting comprises multiplying the previous residual with a coefficient, here referred to as "back-residual coefficient". Delta observable computing unit 140 is configured for computing delta observables for a current epoch following the previous epoch, wherein computing the delta observables for the current epoch comprises differencing NSS observables at the current epoch and NSS observables at the previous epoch, and wherein the observed NSS observables comprise carrier phase observables and/or code observables. Delta observable correcting unit 150 is configured for, for each of at least some of the delta observables, correcting, using the adjusted previous residual associated with the delta observable, the delta observable computed for the current epoch. Estimator operating unit 110 is further configured for operating the estimator for the current epoch at least based on the corrected delta observables.

In one embodiment, a vehicle comprises a system 100 as described above. The vehicle may for example be an autonomous vehicle such as a self-driving vehicle, a driverless vehicle, a robotic vehicle, a highly automated vehicle, a partially automated vehicle, an aircraft, or an unmanned aerial vehicle. The vehicle may for example be a car, a truck, a bus, a motorcycle, a tractor, a combine harvester, a crop sprayer, a construction equipment, a grader, or a train. Exemplary applications may include machine guidance, construction work, operation of unmanned aerial vehicles (UAV), also known as drones, and operation of unmanned surface vehicles/vessels (USV).

Additional Remarks

Any of the above-described methods and their embodiments may be implemented, at least partially, by means of a computer program or a set of computer programs. The computer program(s) may be loaded on an apparatus, such as for example an NSS receiver (running on a rover station, on a reference station, or within a vehicle) or a server (which may comprise one or a plurality of computers). Therefore, the invention also relates, in some embodiments, to a computer program or set of computer programs, which, when carried out on an apparatus as described above, such as for example an NSS receiver (running on a rover station, on a reference station, or within a vehicle) or a server, carries out any one of the above-described methods and their embodiments.

The invention also relates, in some embodiments, to a computer-readable medium or a computer-program product including the above-mentioned computer program. The computer-readable medium or computer-program product may for instance be a magnetic tape, an optical memory disk, a magnetic disk, a magneto-optical disk, an SSD, a CD ROM, a DVD, a CD, a flash memory unit, or the like, wherein the computer program is permanently or temporarily stored. In some embodiments, a computer-readable medium (or to a computer-program product) has computer-executable instructions for carrying out any one of the methods of the invention.

In one embodiment, a computer program as claimed may be delivered to the field as a computer program product, for example through a firmware or software update to be installed on receivers already in the field. This applies to each of the above-described methods and apparatuses.

NSS receivers may include one or more antennas, configured to receive the signals at the frequencies broadcasted by the satellites, processor units, one or a plurality of accurate clocks (such as crystal oscillators), one or a plurality of central processing units (CPU), one or a plurality of memory units (RAM, ROM, flash memory, or the like), and a display for displaying position information to a user.

Where the terms "estimator operating unit", "residual obtaining unit", "residual adjusting unit", "delta observable computing unit", "delta observable correcting unit", and the like are used herein as units (or sub-units) of an apparatus (such as an NSS receiver), no restriction is made regarding how distributed the constituent parts of a unit (or sub-unit) may be. That is, the constituent parts of a unit (or sub-unit) may be distributed in different software or hardware components or devices for bringing about the intended function. Further, the units may be gathered together for performing their functions by means of a combined, single unit (or sub-unit).

The above-mentioned units and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

Although the present invention has been described on the basis of detailed examples, the detailed examples only serve to provide the skilled person with a better understanding and are not intended to limit the scope of the invention. The scope of the invention is defined by the appended claims.

Abbreviations

BDS BeiDou Navigation Satellite System
C/A coarse/acquisition (code)
CPU central processing unit
GNSS global navigation satellite system
GPS Global Positioning System
I/O input/output
IP Internet Protocol
LMS least mean squares NAVIC NAVigation with Indian Constellation
NSS navigation satellite system
PRN pseudo-random number
QZSS Quasi-Zenith Satellite System
RAM random-access memory
RNSS regional navigation satellite system
ROM read-only memory

REFERENCES

[1] Hofmann-Wellenhof, B., et al., "GNSS, Global Navigation Satellite Systems, GPS, GLONASS, Galileo, & more", Springer-Verlag Wien, 2008.
[2] EP 3 035 080 A1 titled "Navigation satellite system positioning involving the generation of correction information" (Trimble ref.: A4396).
[3] EP 3 130 943 A1 titled "Navigation satellite system positioning involving the generation of tropospheric correction information" (Trimble ref.: 15072-EPO).
[4] Jan Van Sickle, "Two Types of Observables|GEOG 862: GPS and GNSS for Geospatial Professionals", John A. Dutton e-Education Institute, College of Earth and Mineral Sciences, The Pennsylvania State University, retrieved from https://www.e-education.psu.edu/geog862/node/1752 on Nov. 8, 2021.
[5] WO 2012/151006 A1 (application number: PCT/US2012/029694) titled "GNSS Signal Processing with Delta Phase" (Trimble ref.: TNL A-2705PCT).
[6] EP 3 336 584 A1 titled "Outlier-tolerant navigation satellite system positioning method and system" (Trimble ref.: 16032-EPO).
[7] Co-pending Russian patent application with Serial Number 2021132733, filed on Nov. 10, 2021, and titled "Methods and systems for handling outliers when using navigation satellite system observations" (Trimble ref.: 21028-RU).

The invention claimed is:

1. Method, carried out by at least one of a navigation satellite system receiver, hereinafter abbreviated as "NSS receiver", and a processing entity capable of receiving data from the NSS receiver, for estimating parameters useful to determine a position, the NSS receiver observing at least one NSS signal from each of a plurality of NSS satellites over multiple epochs, the method comprising:
operating an estimation process, hereinafter referred to as "estimator", for an epoch, hereinafter referred to as "previous epoch", wherein the estimator uses state variables and computes the values of its state variables at least based on time-differenced observables, hereinafter referred to as "delta observables", computed for the previous epoch;
obtaining residuals, hereinafter referred to as "previous residuals", from the estimator, each previous residual being associated with a delta observable computed for the previous epoch;
for each of at least some of the delta observables, adjusting the previous residual associated with the delta observable, wherein adjusting comprises multiplying the previous residual with a coefficient, hereinafter referred to as "back-residual coefficient";
computing delta observables for another epoch, hereinafter referred to as "current epoch", the current epoch following the previous epoch, wherein computing the delta observables for the current epoch comprises differencing NSS observables observed by the NSS receiver at the current epoch and NSS observables observed by the NSS receiver at the previous epoch, and wherein the observed NSS observables comprise at least one of:
carrier phase observables, and
code observables;
for each of at least some of the delta observables, correcting, using the adjusted previous residual associated with the delta observable, the delta observable computed for the current epoch; and
operating the estimator for the current epoch at least based on the corrected delta observables.

2. Method of claim 1, wherein the back-residual coefficient has a value that is larger than 0 and smaller than, or equal to, 1, preferably a value comprised between 0.05 and 1, more preferably a value comprised between 0.2 and 0.8, even more preferably a value comprised between 0.35 and 0.65.

3. Method of claim 1, further comprising, for each of at least some of the delta observables associated with the residuals:
determining an estimated observation drift over a time period preceding the current epoch; and
determining a value of the back-residual coefficient associated with the delta observable based on the estimated observation drift, wherein the larger the estimated observation drift, the smaller the back-residual coefficient.

4. Method according to claim 1, further comprising:
determining that, for the previous epoch, at least one delta observable, hereinafter referred to as "affected delta observable", is an outlier; and
deselecting the at least one affected delta observable, wherein deselecting the at least one affected delta observable comprises operating the estimator for the previous epoch without taking the at least one affected delta observable into account.

5. Method of claim 4, further comprising:
computing, for each of at least one affected delta observable, a previous residual, hereinafter referred to as "estimator-driven synthetic previous residual", associated with the affected delta observable;
wherein the operation of, for each of at least some of the delta observables, adjusting the previous residual associated with the delta observable comprises doing so also for each estimator-driven synthetic previous residual.

6. Method of claim 4, further comprising:
setting, for each of at least one affected delta observable, a previous residual associated with the affected delta observable to zero.

7. Method of claim 4, further comprising, for each of at least one affected delta observable:
determining whether a degree of outlierness of the outlier, which the affected delta observable has been determined to be, exceeds a threshold, hereinafter referred to as "outlierness threshold"; and
if so, setting a previous residual associated with the affected delta observable to zero, and
otherwise:
computing a previous residual, hereinafter referred to as "estimator-driven synthetic previous residual", associated with the affected delta observable;
wherein the operation of, for each of at least some of the delta observables, adjusting the previous residual associated with the delta observable comprises doing so also for the estimator-driven synthetic previous residual.

8. Method of claim 4, further comprising, for each of at least one affected delta observable:
- determining whether one of a duration or a number of epochs during which the affected delta observable has been an outlier exceeds a threshold, hereinafter referred to as "persistence threshold"; and
- if so, setting a previous residual associated with the affected delta observable to zero, and
- otherwise:
  - computing a previous residual, hereinafter referred to as "estimator-driven synthetic previous residual", associated with the affected delta observable;
  - wherein the operation of, for each of at least some of the delta observables, adjusting the previous residual associated with the delta observable comprises doing so also for the estimator-driven synthetic previous residual.

9. Method of claim 4, further comprising, for each of at least one affected delta observable:
- determining whether a degree of outlierness of the outlier, which the affected delta observable has been determined to be, exceeds a threshold, hereinafter referred to as "outlierness threshold", or one of a duration or a number of epochs during which the affected delta observable has been an outlier exceeds a threshold, hereinafter referred to as "persistence threshold"; and
- if so, setting a previous residual associated with the affected delta observable to zero, and
- otherwise:
  - computing a previous residual, hereinafter referred to as "estimator-driven synthetic previous residual", associated with the affected delta observable;
  - wherein the operation of, for each of at least some of the delta observables, adjusting the previous residual associated with the delta observable comprises doing so also for the estimator-driven synthetic previous residual.

10. Method of claim 7, wherein the outlierness threshold has a value that depends on at least one of:
- the delta observable's type; and
- an expected noise level of the delta observable.

11. Method of claim 7, wherein at least one of the following applies:
- the outlierness threshold applicable to a delta carrier phase observable has a value comprised between 0.1 and 1 cycle, preferably a value comprised between 0.1 and 0.5 cycle; and
- the outlierness threshold applicable to a delta code observable has a value comprised between 0.1 and 10 meters.

12. Method of claim 8, wherein the persistence threshold has a value that depends on at least one of:
- the delta observable's type; and
- an expected noise level of the delta observable.

13. Method of claim 8, wherein the persistence threshold has one of
- a value comprised between 2 and 10 epochs, preferably a value comprised between 2 and 5 epochs; and
- a value comprised between 0.1 and 5 seconds, preferably a value comprised between 0.2 and 1 second for a delta carrier phase observable and preferably a value comprised between 0.1 and 5 seconds for a delta code observable.

14. Method according to claim 1, wherein the estimator comprises at least one of a Kalman filter, a least mean squares estimator, and a robust estimator.

15. Method according to claim 1, wherein obtaining the previous residuals, from the estimator, comprises obtaining post-fit residuals, each post-fit previous residual being associated with a delta observable computed for the previous epoch.

16. Computer program or set of computer programs comprising computer-readable instructions configured, when executed on a computer or set of computers, to cause the computer or set of computers to carry out the method according to claim 1.

17. Computer program product or storage mediums comprising a computer program or set of computer programs according to claim 16.

18. System comprising at least one of a navigation satellite system receiver, hereinafter abbreviated as "NSS receiver", and a processing entity capable of receiving data from the NSS receiver, the system being for estimating parameters useful to determine a position, the NSS receiver being configured for observing at least one NSS signal from each of a plurality of NSS satellites over multiple epochs, and the system being configured for:
- operating an estimation process, hereinafter referred to as "estimator", for an epoch, hereinafter referred to as "previous epoch", wherein the estimator uses state variables and computes the values of its state variables at least based on time-differenced observables, hereinafter referred to as "delta observables" computed for the previous epoch;
- obtaining residuals, hereinafter referred to as "previous residuals", from the estimator, each previous residual being associated with a delta observable computed for the previous epoch;
- for each of at least some of the delta observables, adjusting the previous residual associated with the delta observable, wherein adjusting comprises multiplying the previous residual with a coefficient, hereinafter referred to as "back-residual coefficient";
- computing delta observables for another epoch, hereinafter referred to as "current epoch", the current epoch following the previous epoch, wherein computing the delta observables for the current epoch comprises differencing NSS observables observed by the NSS receiver at the current epoch and NSS observables observed by the NSS receiver at the previous epoch, and wherein the observed NSS observables comprise at least one of:
  - carrier phase observables, and
  - code observables;
- for each of at least some of the delta observables, correcting, using the adjusted previous residual associated with the delta observable, the delta observable computed for the current epoch; and
- operating the estimator for the current epoch at least based on the corrected delta observables.

19. Vehicle comprising a system according to claim 18, the vehicle preferably being at least one of: a motor vehicle, an agricultural tractor, a combine harvester, a crop sprayer, a construction equipment, a truck, a bus, a train, a motorcycle, an autonomous vehicle, a self-driving vehicle, a driverless vehicle, a robotic vehicle, a highly automated vehicle, an aircraft, and an unmanned aerial vehicle.

* * * * *